USO11330439B2

(12) United States Patent
Kim

(10) Patent No.: US 11,330,439 B2
(45) Date of Patent: May 10, 2022

(54) METHOD AND APPARATUS OF SUPPORTING LOSSLESS PDCP VERSION CHANGE IN NEXT-GENERATION MOBILE COMMUNICATION SYSTEM

(71) Applicant: Samsung Electronics Co., Ltd., Gyeonggi-do (KR)

(72) Inventor: Donggun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/533,169

(22) Filed: Aug. 6, 2019

(65) Prior Publication Data

US 2020/0053566 A1    Feb. 13, 2020

(30) Foreign Application Priority Data

Aug. 8, 2018   (KR) .......................... 10-2018-0092323

(51) Int. Cl.
*H04W 12/106*   (2021.01)
*H04W 76/30*   (2018.01)
(Continued)

(52) U.S. Cl.
CPC ......... *H04W 12/106* (2021.01); *H04L 1/1671* (2013.01); *H04L 5/0055* (2013.01);
(Continued)

(58) Field of Classification Search
None
See application file for complete search history.

(56) References Cited

U.S. PATENT DOCUMENTS

| 10,397,754 B2 | 8/2019 | Vajapeyam et al. |
| 2009/0034476 A1* | 2/2009 | Wang ................ H04W 36/0011 370/331 |

(Continued)

FOREIGN PATENT DOCUMENTS

| KR | 1020180037960 | 4/2018 |
| KR | 1020190017309 | 2/2019 |
| WO | WO 2018/030798 | 2/2018 |

OTHER PUBLICATIONS

Ericsson, "PDCP Version Change for SRBs", R2-1713438, 3GPP Tsg-Ran WG2 #100, Nov. 27 - Dec. 1, 2017, 4 pages.
(Continued)

*Primary Examiner* — James P Duffy
(74) *Attorney, Agent, or Firm* — The Farrell Law Firm, P.C.

(57) ABSTRACT

Disclosed is a communication method and system for converging a 5$^{th}$-Generation (5G) communication system for supporting higher data rates beyond a 4$^{th}$-Generation (4G) system with the Internet of Things (IoT), and may be applied to intelligent services based on 5G and the IoT-related technologies, such as smart home, smart building, smart city, smart car, connected car, health care, digital education, smart retail, security and safety services. A method herein by a terminal in a communication system includes receiving a radio resource control (RRC) message including information associated with a change from a first packet data convergence protocol (PDCP) entity for a bearer to a second PDCP entity for the bearer, identifying first data to be transferred from the first PDCP entity to the second PDCP entity among second data stored in the first PDCP entity, transferring the first data to the second PDCP entity, discarding the second data stored in the first PDCP entity and
(Continued)

releasing the first PDCP entity, and processing the transferred first data in the second PDCP entity.

18 Claims, 16 Drawing Sheets

(51) Int. Cl.
    *H04W 12/0433*     (2021.01)
    *H04L 69/22*     (2022.01)
    *H04L 5/00*     (2006.01)
    *H04L 1/16*     (2006.01)
    *H04L 47/32*     (2022.01)

(52) U.S. Cl.
    CPC .............. *H04L 47/32* (2013.01); *H04L 69/22* (2013.01); *H04W 12/0433* (2021.01); *H04W 76/30* (2018.02)

(56) References Cited

U.S. PATENT DOCUMENTS

2009/0103478 A1     4/2009   Sammour et al.
2012/0052856 A1*   3/2012   Wu ....................... H04W 24/10
                                                                                 455/422.1
2018/0176974 A1     6/2018   Fujishiro et al.
2018/0199251 A1     7/2018   Kim et al.
2018/0376383 A1*   12/2018   Belghoul .............. H04W 36/28

OTHER PUBLICATIONS

Samsung, "PDCP Operations during PDCP Version Change in EN-DC", R2-1711146, 3GPP TSG-RAN WG2 2017 RAN2#99bis Meeting, Oct. 9-13, 2017, 12 pages.

International Search Report dated Nov. 14, 2019 issued in counterpart application No. PCT/KR2019/009430, 9 pages.

Intel Corporation, "RLC and MAC Handling for Bearer Type Change", R2-1707050, 3GPP TSG-RAN WG2 Meeting Ad hoc, Jun. 27-29, 2017, 5 pages.

Huawei, Summary of 99#18 Bearer Type Change (Huawei), R2-1711090, 3GPP TSG-RAN WG2 #99bis, Oct. 9-13, 2017, 32 pages.

Huawei (rapporteur), "Summary of [97bis#12][NR] Bearer Type Change (Huawei)", R2-17005155, 3GPP TSG-RAN WG2 Meeting #98, May 15-19, 2017, 27 pages.

European Search Report dated May 11, 2021 issued in counterpart application No. 19848454.5-1231, 10 pages.

* cited by examiner

METHOD AND APPARATUS OF SUPPORTING LOSSLESS PDCP VERSION CHANGE IN NEXT-GENERATION MOBILE COMMUNICATION SYSTEM

CROSS-REFERENCE TO RELATED APPLICATION(S)

This application is based on and claims priority under 35 U.S.C. § 119 to Korean Patent Application No. 10-2018-0092323, filed on Aug. 8, 2018, in the Korean Intellectual Property Office, the disclosure of which is incorporated by reference herein in its entirety.

BACKGROUND

1. Field

The disclosure relates generally to a user equipment (UE), and more particularly, to a method and an apparatus for changing the version of a packet data convergence protocol (PDCP) without data loss in a next-generation mobile communication system.

2. Description of Related Art

To meet the demand for wireless data traffic having increased since deployment of 4G communication systems, efforts have been made to develop an improved 5G or pre-5G communication system, also referred to as a 'beyond 4G network' or a 'post LTE system'. The 5G communication system is considered to be implemented in higher frequency (mmWave) bands, such as 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is being made based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and frequency quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Accordingly, research has been conducted to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered to be as an example of convergence between the 5G and IoT technologies.

A network supporting a next-generation mobile communication system can also support an LTE system and can provide services for UEs via a next-generation mobile communication base station and an LTE base station which are installed. In the network, a UE may receive services by accessing the next-generation mobile communication base station or the LTE base station. However, when the UE simultaneously accesses the next-generation mobile communication base station and the LTE base station, the network requires a procedure for changing an LTE PDCP-layer device, which processes data served through the LTE base station, to a new radio (NR) PDCP-layer device of the next-generation mobile communication system in order to enable the next-generation mobile communication base station, which is capable of operating a larger number of transmission resources and has improved performance, to manage all traffic for the UE. However, data loss occurs when an LTE PDCP-layer device of the UE is changed to an NR PDCP-layer device due to a change between the PDCP-layer devices of the two different systems or when the LTE PDCP-layer device is changed to the NR PDCP-layer device.

As such, it is necessary to prevent such data loss when a change occurs between the PDCP-layer devices of the two different systems.

SUMMARY

Aspects of the disclosure are to address at least the above-mentioned problems and/or disadvantages and to provide at least the advantages described below. Accordingly, an aspect of the disclosure is to provide a method and an apparatus for changing a long term evolution (LTE) PDCP-layer device to an NR PDCP-layer device.

Another aspect of the disclosure is to provide a method and an apparatus for changing an NR PDCP-layer device to an LTE PDCP-layer device.

Another aspect of the disclosure is to provide a network which, when a UE simultaneously accesses a next-generation mobile communication base station and an LTE base station, performs a procedure for changing an LTE PDCP-layer device, which processes data served through the LTE base station, to an NR PDCP-layer device of the next-generation mobile communication system in order to enable the next-generation mobile communication base station, which is capable of operating a larger number of transmission resources and has improved performance, to manage all traffic for the UE.

Another aspect of the disclosure is to provide a method and an apparatus for preventing data loss in a process of changing the version of a PDCP-layer device of the UE (when an LTE PDCP-layer device of the UE is changed to an NR PDCP-layer device or when the LTE PDCP-layer device of the UE is changed to the NR PDCP-layer device) in the procedure, to prevent unnecessary retransmission by an upper-layer device, thus preventing a transmission delay and the waste of transmission resources.

In accordance with an aspect of the disclosure, a method by a terminal in a communication system includes receiving a radio resource control (RRC) message including information associated with a change from a first PDCP entity for a bearer to a second PDCP entity for the bearer, identifying first data to be transferred from the first PDCP entity to the second PDCP entity among second data stored in the first PDCP entity, transferring the first data to the second PDCP entity, discarding the second data stored in the first PDCP entity and releasing the first PDCP entity, and processing the transferred first data in the second PDCP entity In accordance with another aspect of the disclosure, a terminal in a communication system is provided. The terminal comprises a transceiver and a controller coupled with the transceiver and configured to receive an RRC message including information associated with a change from a first PDCP entity for a bearer to a second PDCP entity for the bearer, identify first data to be transferred from the first PDCP entity to the second PDCP entity among second data stored in the first PDCP entity, transfer the first data to the second PDCP, discard the second data stored in the first PDCP entity and release the first PDCP entity, and process the transferred first data in the second PDCP entity.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
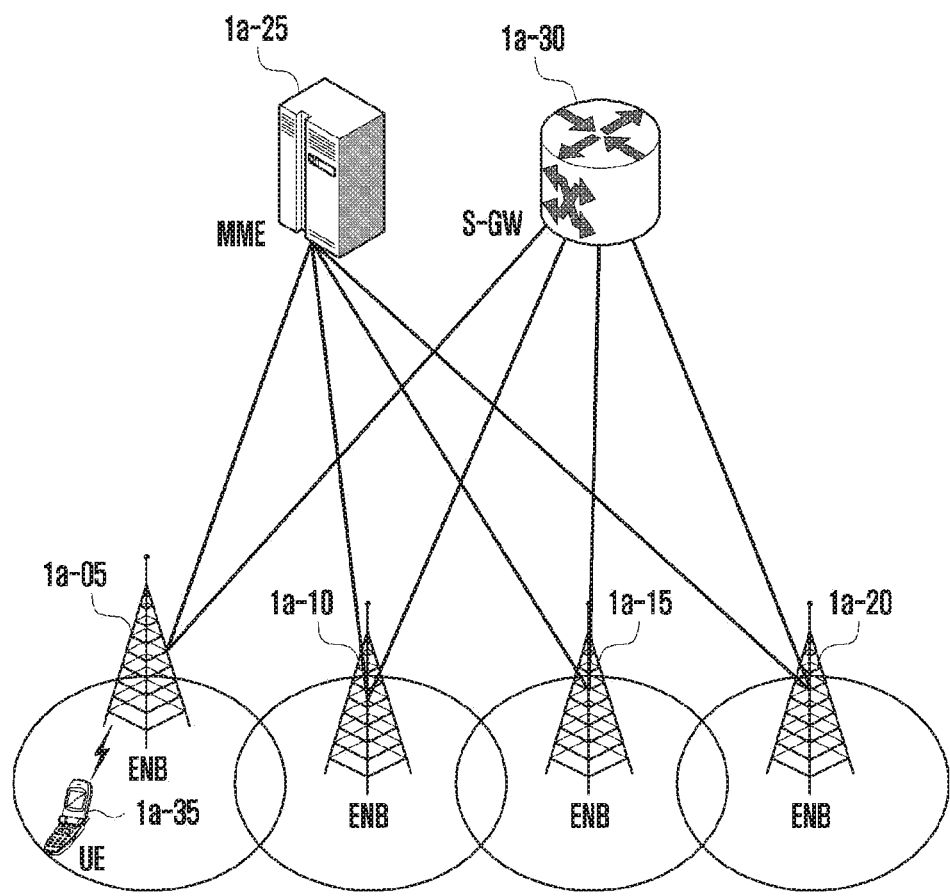
FIG. 1 illustrates the structure of an LTE system according to an embodiment.

Hereinafter, embodiments of the disclosure will be described with reference to accompanying drawings, in which a size of each component may be exaggerated for convenience. Detailed descriptions of known functions and configurations incorporated herein will be omitted for the sake of clarity and conciseness.

The terms which will be described below are defined in consideration of the functions in the disclosure, and may be different according to users, intentions of the users, or customs. Therefore, the definitions of the terms, such as for identifying an access node, referring to network entities, referring to messages, referring to an interface between network objects, and referring to various identification information, should be made based on the contents throughout the specification. The disclosure is not limited by the following terms, and other terms referring to objects having equivalent technical meanings may be used.

For convenience of explanation, embodiments herein use terms and words defined in the third generation partnership project long term evolution (3GPP LTE) standard. However, the disclosure is not limited by these terms and words and may be equally applied to systems in accordance with other standards. In embodiments, the term evolved Node B (eNB) may be used interchangeably with gNB (5G base station or next generation node B) for convenience of explanation. That is, an eNB illustrated as a base station may refer to a gNB. The term "terminal" or "UE" may refer to a mobile phone, narrow band-Internet of things (NB-IoT) devices, sensors, and other wireless communication devices.

A PDCP, RLC, medium access control (MAC), and physical (PHY) may be used interchangeably with a PDCP layer, an RLC layer, a MAC layer, and a PHY layer, respectively, or with a PDCP-layer device, an RLC-layer device, a MAC-layer device, and a PHY-layer device, respectively. An existing version of a PDCP-layer device may be defined as a first PDCP-layer device, and a new version of the PDCP-layer device may be defined as a second PDCP-layer device.

A network supporting a next-generation mobile communication system can also support an LTE system and can provide services for UEs via a next-generation mobile communication base station (NR base station) and an LTE base station which are installed. In the network, a UE may receive services by accessing the next-generation mobile communication base station or the LTE base station. However, when the UE simultaneously accesses the next-generation mobile communication base station and the LTE base station, the network requires a procedure for changing an LTE PDCP-layer device, which processes data served through the LTE base station, to an NR PDCP-layer device of the next-generation mobile communication system in order to enable the next-generation mobile communication base station (NR base station), which is capable of operating a larger number of transmission resources and has improved performance, to manage all traffic for the UE.

Data loss may occur when an LTE PDCP-layer device of the UE is changed to an NR PDCP-layer device due to a change between the PDCP-layer devices of the two different systems or when the LTE PDCP-layer device of the UE is changed to the NR PDCP-layer device. Also, when the UE (non-standalone: NSA) simultaneously connected to the NR base station and the LTE base station is disconnected from the NR base station and is thus served only by the LTE base station, data loss may occur during a procedure for changing the changed NR PDCP-layer device back to the LTE PDCP-layer device is required.

Therefore, disclosed herein is a procedure for changing a PDCP-layer device without data loss when a UE receives an RRC message from an LTE base station or an NR base station and a change from an LTE PDCP-layer device to an NR PDCP-layer device or a change from the NR PDCP-layer device to the LTE PDCP-layer device is indicated for a bearer having the same bearer identifier. Specifically, before the version of a PDCP-layer device is changed, the UE transmits pieces of data stored in the LTE PDCP-layer device before the change to a newly changed (NR) PDCP-layer device or newly stores the data in the newly changed PDCP-layer device so that the newly changed NR PDCP-layer device considers the data as being newly received and processes the data.

The UE may determine data to transmit to or store in the newly changed PDCP-layer device among the pieces of data stored in the LTE PDCP-layer device before the change according to one of the following methods.

1. First method: The UE may deliver and store all pieces of the data stored in the LTE PDCP-layer device or the NR PDCP-layer device before the change to and in the newly changed PDCP-layer device, so that the newly changed PDCP-layer device process the data as new data and delivers the data to a lower-layer device for transmission.

2. Second method (cumulative retransmission): The UE may deliver and store all pieces of data having a value equal to or greater than the PDCP sequence number or the COUNT value of first data, of which successful delivery is not acknowledged (RLC NACK) from RLC-layer devices (via RLC status packet data units (PDUs)) connected to the PDCP-layer device before the change, among the data stored in the LTE PDCP-layer device or the NR PDCP-layer device before the change in ascending order, or all pieces of data received from an upper-layer device after the first data in sequence to and in the newly changed PDCP-layer device, so that the newly changed PDCP-layer device process the data as new data and delivers the data to a lower-layer device for transmission.

3. Third method (selective retransmission): The UE may deliver and store only pieces of data, of which successful delivery is not acknowledged (RLC NACK) from RLC-layer devices (via RLC status PDUs) connected to the PDCP-layer device before the change, among the data stored in the PDCP-layer device before the change, in ascending order of PDCP sequence numbers or COUNT values or in order as received from an upper-layer device, to and in the newly changed PDCP-layer device, so that the newly changed PDCP-layer device process the data as new data and delivers the data to a lower-layer device for transmission.

In another method, the successful delivery of data of a PDCP-layer device may be identified using not only an RLC status report (RLC status PDU) of an RLC-layer device but also a PDCP status report of the PDCP-layer device.

FIG. 1 illustrates the structure of an LTE system according to an embodiment.

Referring to FIG. 1, a radio access network of the LTE system includes an evolved node B (hereinafter, referred to as an eNB, a Node B or a base station) 105, 110, 115 or 120, a mobility management entity (MME) 125, and a serving gateway (S-GW) 130. A user equipment (UE or terminal) 135 accesses an external network through the eNBs 105, 110, 115, and 120 and the S-GW 130.

In FIG. 1, the eNBs 105, 110, 115, and 120 correspond to existing node B's of a universal mobile telecommunication system (UMTS), are connected to the UE 135 over a wireless channel, and perform a more complex role than that of the existing Nodes B. In the LTE system, since all user traffic including a real-time service, such as a voice over Internet protocol (VoIP) service, is provided through a shared channel, a device that collects state information, such as UEs' buffer status, available transmission power state, and channel state, and performs scheduling is required. The eNBs 105, 110, 115, and 120 are responsible for these functions. One eNB generally controls a plurality of cells.

For example, in order to realize a transmission speed of 100 Mbps, the LTE system uses orthogonal frequency division multiplexing (FDM) as a radio access technology, such as at a bandwidth of 20 MHz. In addition, the LTE system applies adaptive modulation & coding (AMC), which determines a modulation scheme and a channel coding rate according to the channel state of a UE. The S-GW 130 provides a data bearer and generates or removes a data bearer under the control of the MME 125. The MME 125 performs not only a mobility management function for the UE 135 but also various control functions and is connected to a plurality of base stations 105, 110, 115, and 120.

Figure 2:
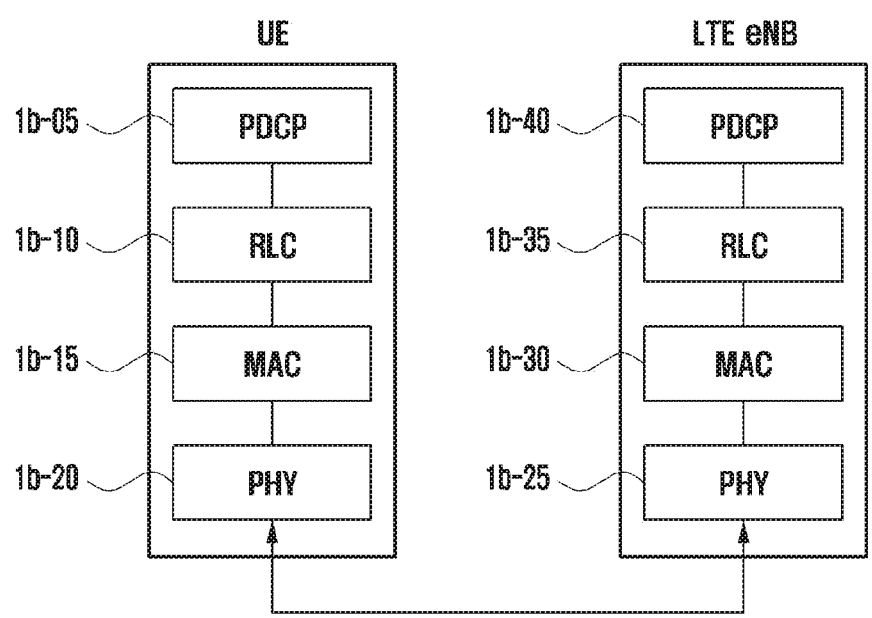
FIG. 2 illustrates the wireless protocol structure of an LTE system according to an embodiment.

FIG. 2 illustrates the wireless protocol structure of an LTE system according to an embodiment.

Referring to FIG. 2, a wireless protocol of the LTE system includes packet data convergence protocols (PDCPs) 205 and 240, radio link controls (RLCs) 210 and 235, and medium access controls (MACs) 215 and 230 respectively at a UE and an eNB. The PDCPs 205 and 240 are responsible for IP header compression/decompression or the like.

Main functions of the PDCPs are summarized as follows.
  Header compression and decompression (robust header compression (ROHC) only)
  Transfer of user data
  In-sequence delivery of upper-layer PDUs at PDCP re-establishment procedure for RLC AM (acknowledged mode)
  For split bearers in DC (only support for RLC AM), PDCP PDU routing for transmission and PDCP PDU reordering for reception
  Duplicate detection of lower-layer service data units (SDUs) at PDCP re-establishment procedure for RLC AM
  Retransmission of PDCP SDUs at handover and, for split bearers in DC, of PDCP PDUs at PDCP data-recovery procedure, for RLC AM Ciphering and deciphering Timer-based SDU discard in uplink The RLCs 210 and 235 reconstruct a PDCP PDU into a proper size and perform an automatic repeat request (ARQ) operation. Main functions of the RLCs are summarized as follows.

Transfer of upper-layer PDUs

Error Correction through ARQ (only for AM data transfer)

Concatenation, segmentation, and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 215 and 230 are connected to a plurality of RLC-layer devices configured in one device, multiplex RLC PDUs into a MAC PDU, and demultiplex a MAC PDU into RLC PDUs. Main functions of the MACs are summarized as follows.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid automatic repeat request (HARQ)

Priority handling between logical channels of one UE

Priority handling between UEs by means of dynamic scheduling

Multimedia broadcast multicast service (MBMS) service identification

Transport format selection

Padding

Physical (PHY) layers 220 and 225 perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

Figure 3:
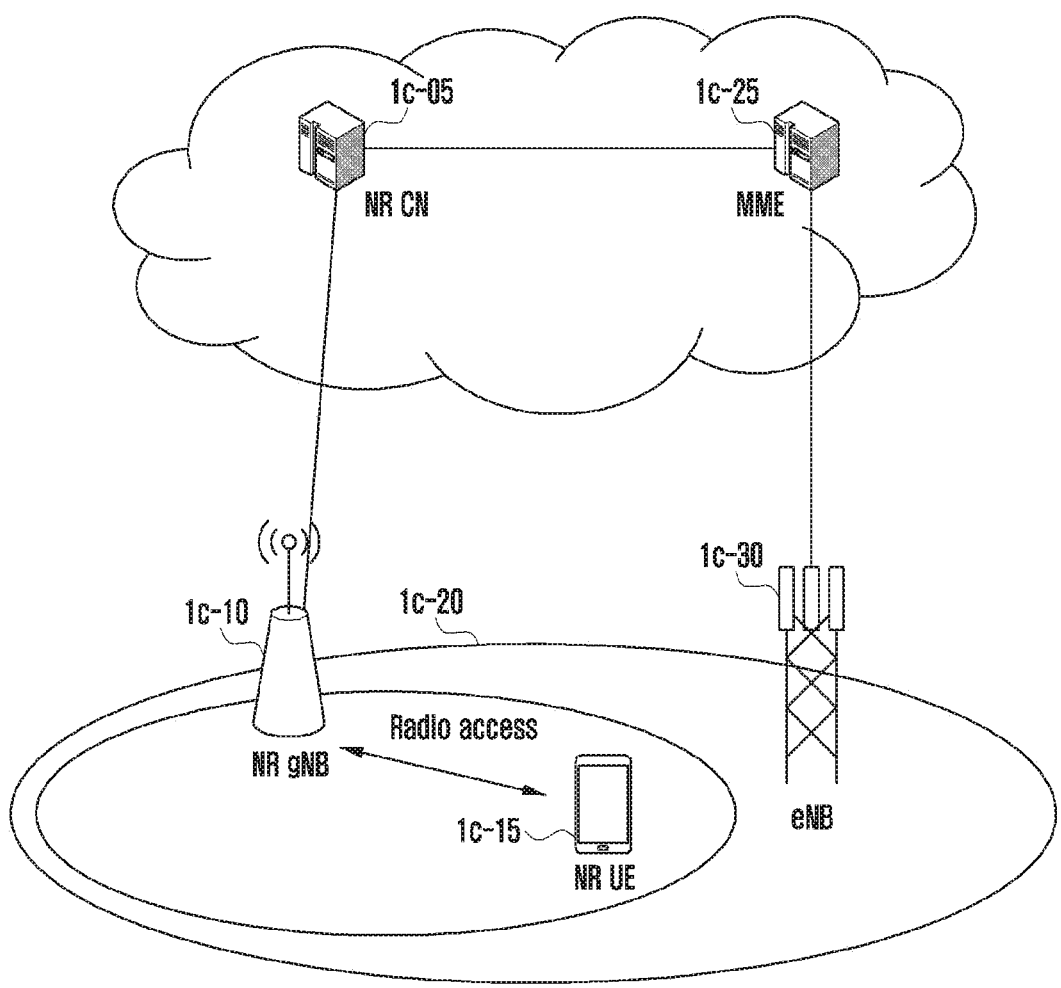
FIG. 3 illustrates the structure of a next-generation mobile communication system according to an embodiment.

FIG. 3 illustrates the structure of a next-generation mobile communication system according to an embodiment.

Referring to FIG. 3, a radio access network of the next-generation mobile communication system (NR or 5G) includes a new radio node B (NR gNB or NR base station) 310 and a new radio core network (NR CN) 305. A new radio user equipment (NR UE or terminal) 315 accesses an external network through the NR gNB 310 and the NR CN 305.

In FIG. 3, the NR gNB 310 corresponds to an eNB of an existing LTE system, and is connected to the NR UE 315 over a wireless channel to provide a more advanced service than that of the existing eNB. In the next-generation mobile communication system, since all user traffic is served through a shared channel, a device that collects state information, such as UEs' buffer status, available transmission power state, and channel state, and performs scheduling is required, and is the responsibility of the NR gNB 310.

One NR gNB generally controls a plurality of cells. In order to realize ultrahigh-speed data transmission compared to current LTE, the NR may have a bandwidth greater than the existing maximum bandwidth and may employ a beam-forming technique in addition to OFDM as a radio access technology. The NR applies AMC, which determines a modulation scheme and a channel coding rate according to the channel state of a UE. The NR CN 305 performs functions of mobility support, bearer setup, and quality of service (QoS) setup. The NR CN 305 performs not only a mobility management function for a UE but also various control functions and is connected to a plurality of base stations. The next-generation mobile communication system may also interwork with the existing LTE system, in which case the NR CN 305 is connected to an MME 325 through a network interface. The MME 325 is connected to the eNB 330, which is an existing base station.

Figure 4:
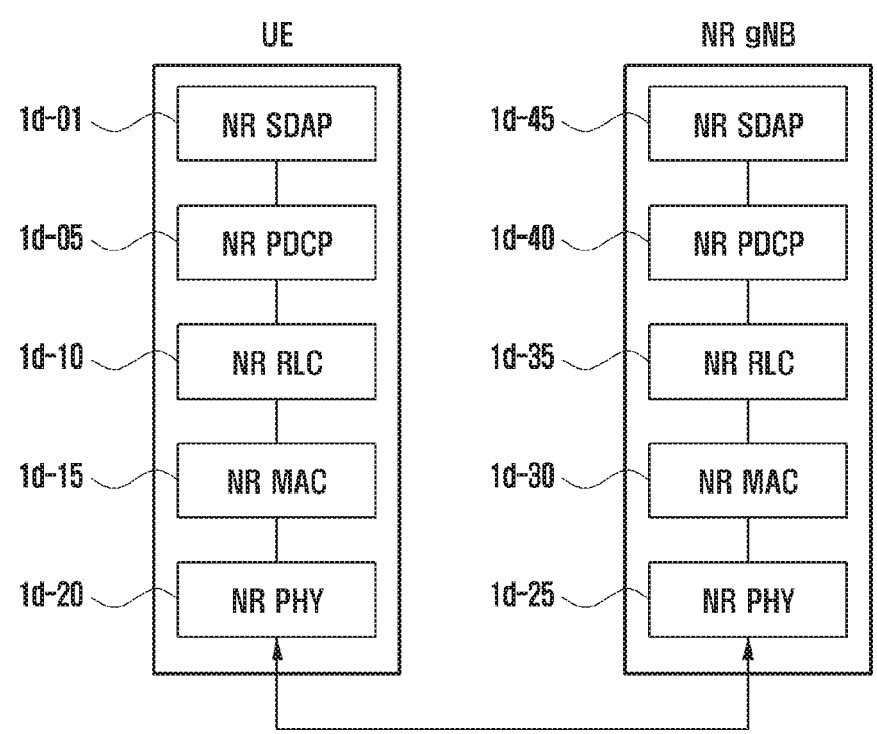
FIG. 4 illustrates the wireless protocol structure of a next-generation mobile communication system according to an embodiment.

FIG. 4 illustrates the wireless protocol structure of a next-generation mobile communication system according to an embodiment.

Referring to FIG. 4, a wireless protocol of the next-generation mobile communication system includes NR service data adaptation protocols (SDAPs) 401 and 445, NR PDCPs 405 and 440, NR RLCs 410 and 435, and NR MACs 415 and 430 respectively at a UE and an NR base station (NR gNB).

Main functions of the NR SDAPs 401 and 445 may include some of the following functions.

Transfer of user plane data

Mapping between QoS flow and data radio bearer (DRB) for both DL and UL

Marking QoS flow ID in both DL and UL packets

Reflective QoS flow-to-DRB mapping for UL SDAP PDUs

Regarding the SDAP-layer devices, the UE may receive a configuration about whether to use a header of the SDAP-layer devices or whether to use the SDAP-layer devices for each PDCP-layer device, each bearer, or each logical channel via an RRC message. When an SDAP header is configured, a one-bit non-access stratum (NAS) QoS reflective indicator (NAS reflective QoS) and a one-bit AS QoS reflective indicator (AS reflective QoS) of the SDAP header may be used for indication to enable the UE to update or reconfigure uplink and downlink QoS flows and mapping information for a data bearer. The SDAP header may include QoS flow ID information indicating QoS. The QoS information may be used as a data processing priority or scheduling information in order to support a desired service.

Main functions of the NR PDCPs 405 and 440 may include some of the following functions.

Header compression and decompression (ROHC only)

Transfer of user data

In-sequence delivery of upper-layer PDUs

Out-of-sequence delivery of upper-layer PDUs

PDCP PDU reordering for reception

Duplicate detection of lower-layer SDUs

Retransmission of PDCP SDUs

Ciphering and deciphering

Timer-based SDU discard in uplink

Among the above functions, the reordering function of the NR PDCP devices refers to rearranging PDCP PDUs received in a lower layer in order based on the PDCP sequence number (SN) and may include transmitting the data to an upper layer in the order of rearrangement or immediately transmitting the data regardless of order. In addition, the reordering function may include recording lost PDCP PDUs via reordering, may include reporting the state of lost PDCP PDUs to a transmitter, and may include requesting retransmission of lost PDCP PDUs.

Main functions of the NR RLCs 410 and 435 may include the following.

Transfer of upper-layer PDUs
    In-sequence delivery of upper-layer PDUs
    Out-of-sequence delivery of upper-layer PDUs
    Error correction through ARQ
    Concatenation, segmentation, and reassembly of RLC SDUs
    Re-segmentation of RLC data PDUs
    Reordering of RLC data PDUs
    Duplicate detection
    Protocol error detection
    RLC SDU discard
    RLC re-establishment Among the above functions, the in-sequence delivery function of the NR RLC devices refers to delivering RLC SDUs received from a lower layer to an upper layer in order, and may include reassembling and delivering a plurality of RLC SDUs when one original RLC SDU is divided into the plurality of RLC SDUs to be received, rearranging received RLC PDUs based on the RLC SN or the PDCP SN, and recording lost RLC PDUs via reordering.

In addition, the in-sequence delivery function may include reporting the state of lost RLC PDUs to a transmitter, requesting retransmission of lost RLC PDUs, and, if there is a lost RLC SDU, may include delivering only RLC SDUs before the lost RLC SDU to an upper layer in order. The in-sequence delivery function may include delivering all RLC SDUs, received before a timer starts, to an upper layer in order when the timer has expired despite the presence of a lost RLC SDU, or delivering all RLC SDUs received so far to an upper layer in order when the timer expires despite the presence of a lost RLC SDU.

The NR RLC devices may process RLC PDUs in order of reception (the order of arrival regardless of the order of SNs) and may deliver the RLC PDUs to the PDCP devices in an out-of-sequence manner. For a segment, the NR RLC devices may receive segments that are stored in a buffer or are to be received later, may reconstruct the segment into one whole RLC PDU, may process the RLC PDU, and may deliver the RLC PDU to the PDCP devices. The NR RLC layers may not include a concatenation function, and the concatenation function may be performed in the NR MAC layers or may be replaced with a multiplexing function of the NR MAC layers.

The out-of-sequence delivery function of the NR RLC devices refers to delivering RLC SDUs received from a lower layer directly to an upper layer regardless of order, and may include reassembling and delivering a plurality of RLC SDUs when one original RLC SDU is divided into the plurality of RLC SDUs to be received, and recording lost RLC PDUs by storing and reordering the RLC SNs or PDCP SNs of received RLC PDUs.

The NR MACs 415 and 430 may be connected to a plurality of NR RLC-layer devices configured in one device, and main functions of the NR MACs may include some of the following.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding NR PHY layers 420 and 425 may perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

Figure 5:
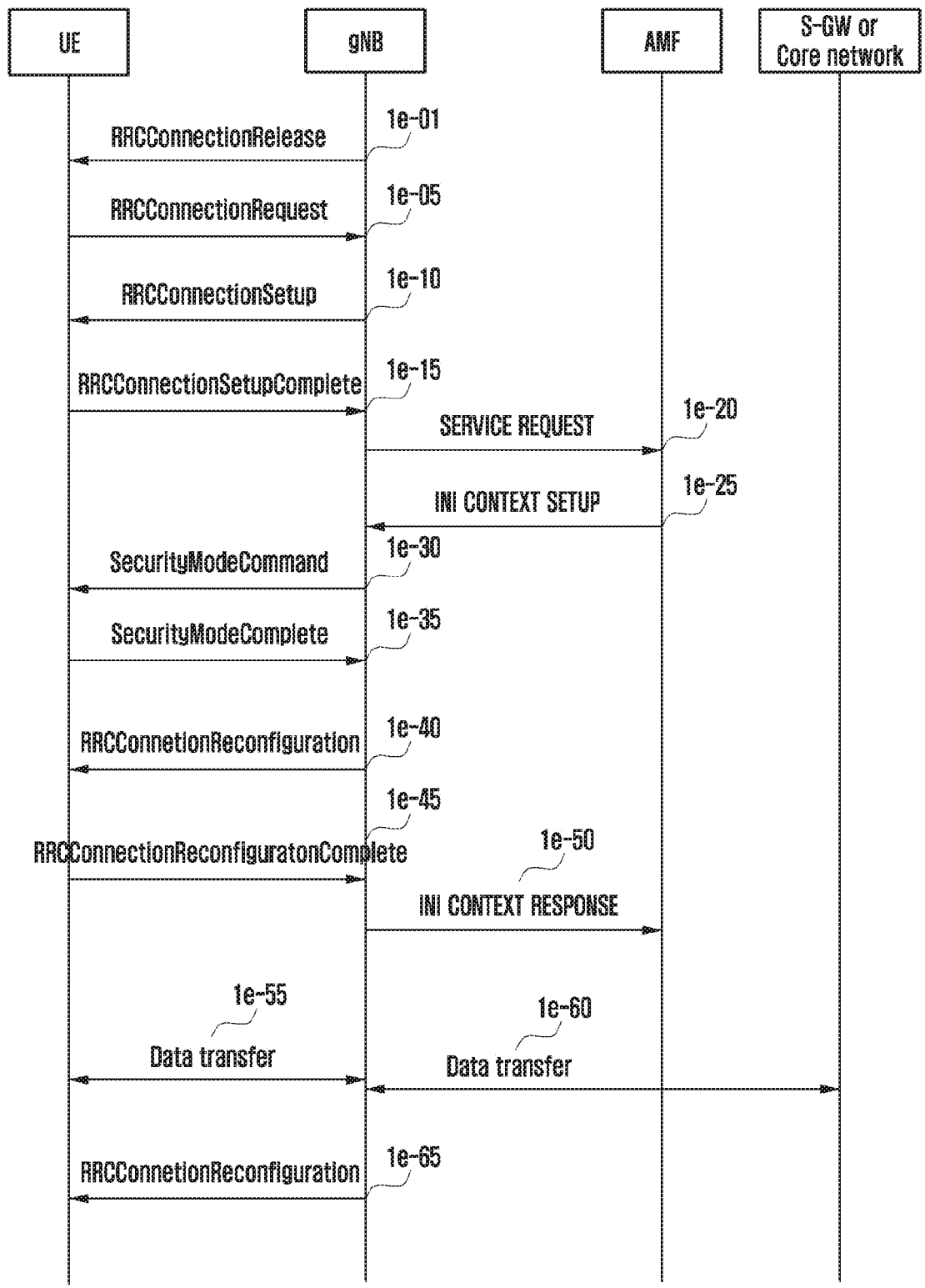
FIG. 5 illustrates a procedure in which a UE establishes an RRC connection with a base station when establishing a connection with a network in a next-generation mobile communication system according to an embodiment.

FIG. 5 illustrates a procedure in which a UE establishes an RRC connection with a base station when establishing a connection with a network in a next-generation mobile communication system according to an embodiment.

Referring to FIG. 5, when the UE transmitting or receiving data in an RRC-connected mode neither transmits nor receives data for a reason or for a certain time, the base station (gNB) may transmit an RRCConnectionRelease message to the UE in step 500, so that the UE switches to an RRC-idle mode. When there is data to transmit, the UE currently not connected (hereinafter, idle-mode UE) may perform an RRC connection establishment process with the base station in step 505.

The UE establishes reverse transmission synchronization with the base station through a random access procedure and transmits an RRCConnectionRequest message to the base station in step 505. The RRCConnectionRequest message may include an identifier of the UE and a reason for establishing a connection (establishmentCause).

The base station transmits an RRCConnectionSetup message so that the UE establishes an RRC connection in step 510. The RRCConnectionSetup message may include at least one of configuration information of each logical channel, configuration information of each bearer, configuration information of a PDCP-layer device, configuration information of an RLC-layer device, and configuration information of a MAC-layer device.

The RRCConnectionSetup message may indicate configurations of the PDCP-layer device, the RLC-layer device, the MAC-layer device, and a PHY-layer device for a bearer corresponding to a signaling radio bearer (SRB) identifier or a data radio bearer (DRB) identifier, and may indicate, for a bearer corresponding to a bearer identifier, whether to configure or release an LTE PDCP-layer device and whether to configure or release an NR PDCP-layer device. The RRCConnectionSetup message may indicate, for a bearer corresponding to a bearer identifier, whether to release the LTE PDCP-layer device to change to the NR PDCP-layer device and to connect the NR PDCP-layer device to an LTE RLC-layer device, and whether to release the NR PDCP-layer device to change to the LTE PDCP-layer device and to reconnect the LTE PDCP-layer device to the LTE RLC-layer device.

When the RRCConnectionSetup message includes a configuration for releasing the LTE PDCP-layer device corresponding to a first bearer identifier, the RRC message (RRCConnectionSetup message) does not include NR PDCP configuration information corresponding to the first bearer identifier, and the NR PDCP-layer device for the first bearer identifier is already configured, the NR PDCP-layer device may establish a connection with the LTE RCP-layer device, which has been connected with the released LTE PDCP-layer device (version change procedure of the PDCP-layer device, which is a change from the LTE PDCP to the NR PDCP). This procedure may be defined as a first condition.

When the RRCConnectionSetup message includes a configuration for releasing the NR PDCP-layer device for the first bearer identifier, which is configured by the connection of the NR PDCP-layer device and the LTE RLC-layer device, and includes LTE PDCP configuration information corresponding to the first bearer identifier, the LTE PDCP-layer device may establish a connection with the LTE RLC-layer device, which has been connected with the released NR PDCP-layer device (version change procedure of the PDCP-layer device, which is a change from the NR PDCP to the LTE PDCP). This procedure may be defined as a second condition.

Upon establishing the RRC connection, the UE transmits an RRCConnetionSetupComplete message to the base station in step 515. The RRCConnetionSetupComplete message may include a control message, such as a SERVICE REQUEST for the UE to request an access management function (AMF) or an MME to configure a bearer for a service. The base station transmits a SERVICE REQUEST message included in the RRCConnetionSetupComplete message to the AMF or the MME in step 520. The AMF or MME may determine whether to provide the service requested by the UE.

When it is determined to provide the service requested by the UE, the AMF or the MME transmits an INITIAL CONTEXT SETUP REQUEST message to the base station in step 525. The INITIAL CONTEXT SETUP REQUEST message may include QoS information to be applied when a DRB is configured and security-related information, such as a security key or a security algorithm, to be applied to the DRB.

The base station transmits a SecurityModeCommand message to the base station in order to enable security with the UE in step 530 and receives a SecurityModeComplete message from the UE in step 535. When security is completely enabled, the base station transmits an RRCConnectionReconfiguration message to the UE in step 540.

The RRCConnectionReconfiguration message may indicate configurations of the PDCP-layer device, the RLC-layer device, the MAC-layer device, and a PHY-layer device for a bearer corresponding to a bearer identifier (for example, an SRB identifier or a DRB identifier). The RRCConnection-Reconfiguration message may indicate, for a bearer corresponding to a bearer identifier, whether to configure or release the LTE PDCP-layer device and to configure or release the NR PDCP-layer device, whether to release the LTE PDCP-layer device to change to the NR PDCP-layer device and to connect the NR PDCP-layer device to the LTE RLC-layer device, or whether to release the NR PDCP-layer device to change to the LTE PDCP-layer device and to reconnect the LTE PDCP-layer device to the LTE RLC-layer device.

When the RRCConnectionReconfiguration message includes a configuration for releasing the LTE PDCP-layer device corresponding to the first bearer identifier, the RRC-ConnectionReconfiguration message does not include NR PDCP configuration information corresponding to the first bearer identifier, and the NR PDCP-layer device for the first bearer identifier is already configured, the NR PDCP-layer device may establish a connection with the LTE RCP-layer device, which has been connected with the released LTE PDCP-layer device (version change procedure of the PDCP-layer device, which is a change from the LTE PDCP to the NR PDCP). This procedure may be defined as the first condition.

When the RRCConnectionReconfiguration message includes a configuration for releasing the NR PDCP-layer device for the first bearer identifier, which is configured by the connection of the NR PDCP-layer device and the LTE RLC-layer device, and includes LTE PDCP configuration information corresponding to the first bearer identifier, the LTE PDCP-layer device may establish a connection with the LTE RLC-layer device, which has been connected with the released NR PDCP-layer device (version change procedure of the PDCP-layer device, which is a change from the NR PDCP to the LTE PDCP). This procedure may be defined as the second condition.

The RRCConnectionReconfiguration message may include configuration information about a DRB for processing user data, and the UE configures a DRB by applying this information and transmits an RRCConnectionReconfigurationComplete message to the base station in step 545. After completely configuring the DRB with the UE, the base station may transmit an INITIAL CONTEXT SETUP COMPLETE message to the AMF or MME, thereby completing the connection in step 550.

When the above process is completed, the UE transmits and receives data to and from the base station through the AMF and a core network, in step 560. The data transmission process is largely divided into RRC connection setup, security setup, and DRB setup. In addition, the base station may transmit an RRCConnectionReconfiguration message to the UE in order to renew, add, or change a configuration for a reason, in step 565.

The RRCConnectionReconfiguration message may indicate configurations of the PDCP-layer device, the RLC-layer device, the MAC-layer device, and a PHY-layer device for a bearer corresponding to a bearer identifier (for example, an SRB identifier or a DRB identifier), and may indicate, for a bearer corresponding to a bearer identifier, whether to configure or release the LTE PDCP-layer device or the NR PDCP-layer device, whether to release the LTE PDCP-layer device to change to the NR PDCP-layer device, and to connect the NR PDCP-layer device to the LTE RLC-layer device, and whether to release the NR PDCP-layer device to change to the LTE PDCP-layer device and to reconnect the LTE PDCP-layer device to the LTE RLC-layer device.

When the RRCConnectionReconfiguration message includes a configuration for releasing the LTE PDCP-layer device corresponding to the first bearer identifier, the RRC message does not include NR PDCP configuration information corresponding to the first bearer identifier, and the NR PDCP-layer device for the first bearer identifier is already configured, the NR PDCP-layer device may establish a connection with the LTE RCP-layer device, which has been connected with the released LTE PDCP-layer device (version change procedure of the PDCP-layer device, which is a change from the LTE PDCP to the NR PDCP).

When the RRCConnectionReconfiguration message includes a configuration for releasing the NR PDCP-layer device for the first bearer identifier, which is established by the connection of the NR PDCP-layer device and the LTE RLC-layer device, and includes LTE PDCP configuration information corresponding to the first bearer identifier, the LTE PDCP-layer device may establish a connection with the LTE RLC-layer device, which has been connected with the released NR PDCP-layer device (version change procedure of the PDCP-layer device, which is a change from the NR PDCP to the LTE PDCP).

The procedure for establishing the connection between the UE and the base station may be applied to both the establishment of a connection between the UE and an LTE base station and the establishment of a connection between the UE and the NR base station.

A UM DRB denotes a DRB using an RLC-layer device operating in an unacknowledged mode (UM), and an AM DRB denotes a DRB using an RLC-layer device operating in an acknowledged mode (AM). A procedure for changing the version of a PDCP-layer device disclosed herein may be applied to both a change from an NR PDCP to an LTE PDCP and a change from an LTE PDCP to an NR PDCP and may be applied to both a DRB and an SRB. That is, this procedure may be applied to a PDCP version change procedure for a DRB and, if necessary, may also be applied to a PDCP version change procedure for an SRB in an extended manner. The UE may receive an RRC message indicating the procedure for changing the version of the PDCP-layer device from an LTE base station or an NR base station.

Figure 6:
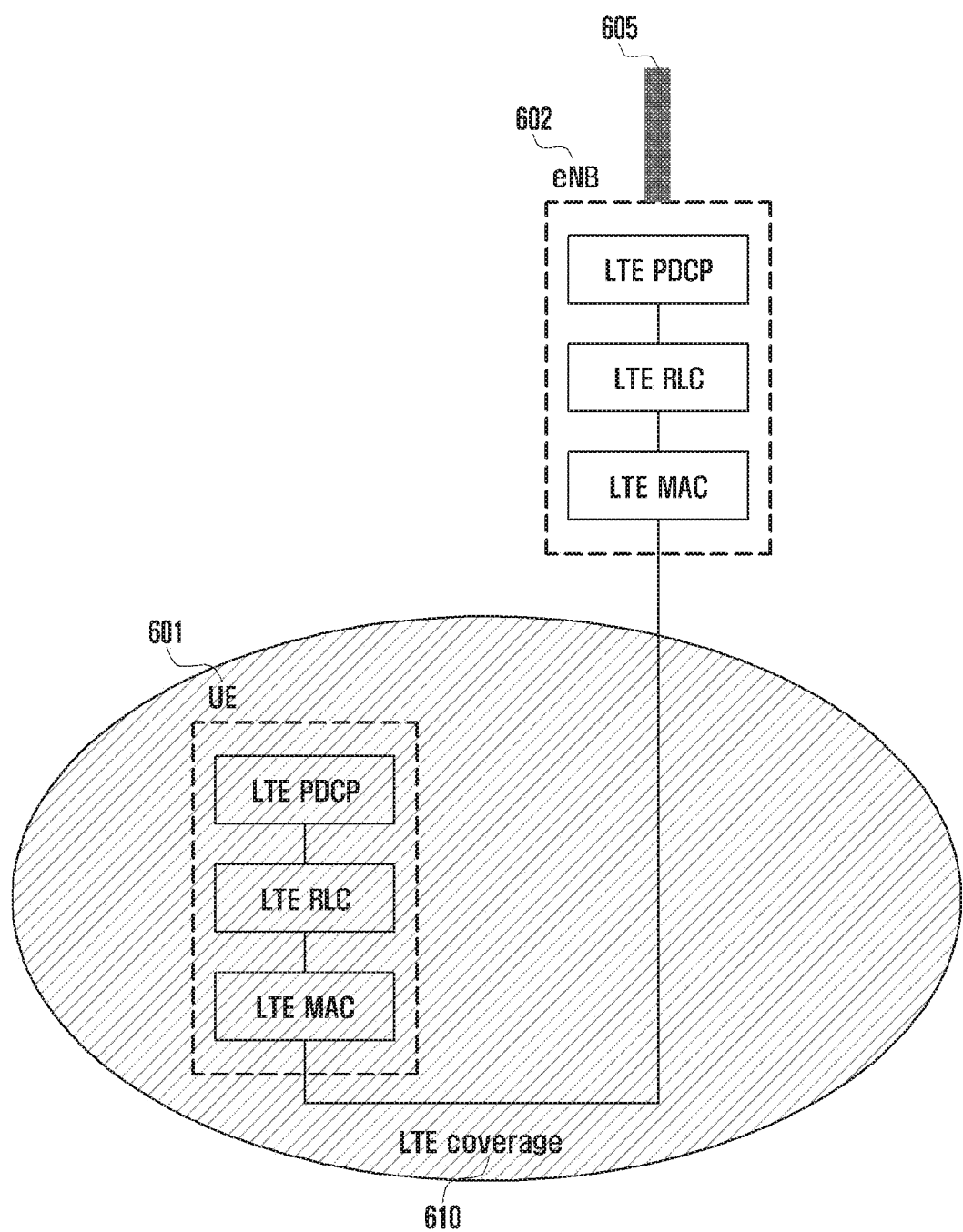
FIG. 6 illustrates a protocol structure in which a UE establishes a connection with an LTE base station and transmits and receives data according to an embodiment.

FIG. 6 illustrates a protocol structure in which a UE establishes a connection with an LTE base station and transmits and receives data according to an embodiment.

Referring to FIG. 6, when a UE 601 is in LTE cell coverage 610 supported by an LTE base station 602, the UE 601 may establish an RRC connection with the LTE base station 602, as described in FIG. 5, and may transmit and receive data for a first bearer 605. Downlink data for the first bearer 605 is processed via an LTE PDCP-layer device, an LTE RLC-layer device, an LTE MAC-layer device, and an LTE PHY-layer device of the LTE base station 602, is transmitted via a radio link, and is received and processed via an LTE PHY-layer device, an LTE MAC-layer device, an LTE RLC-layer device, and an LTE PDCP-layer device of the UE 601. Uplink data for the first bearer 605 is processed via the LTE PDCP-layer device, the LTE RLC-layer device, the LTE MAC-layer device, and the LTE PHY-layer device of the UE 601, is transmitted via the radio link, and is received and processed via the LTE PHY-layer device, the LTE MAC-layer device, the LTE RLC-layer device, and the LTE PDCP-layer device of the LTE base station 602.

Figure 7:
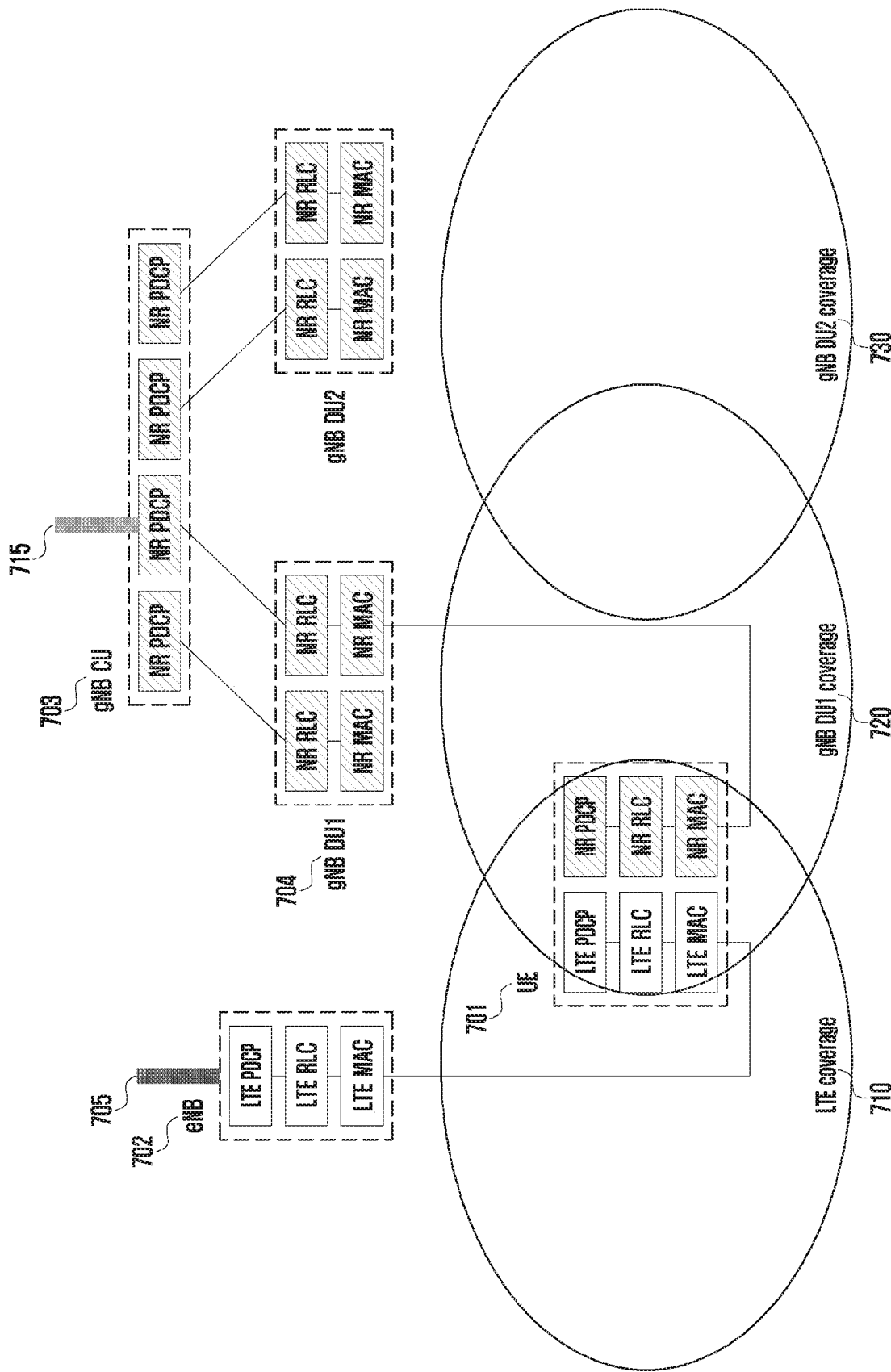
FIG. 7 illustrates a protocol structure in which a UE establishes a connection with an LTE base station, establishes a connection with an NR base station, and transmits and receives data according to an embodiment.

FIG. 7 illustrates a protocol structure in which a UE establishes a connection with an LTE base station, establishes a connection with an NR base station, and transmits and receives data according to an embodiment.

An NR base station may have a central unit (CU)-distributed unit (DU)-split structure. That is, a CU 703 may operate an SDAP-layer device or a PDCP-layer device, and a DU 704 connected with the CU 703 in a wired manner may operate an RLC-layer device, a MAC-layer device, and a PHY-layer device. A gNB DU1 coverage 720 is managed by the gNB DU1 704, and the gNB DU2 coverage 730 is managed by the gNB DU2.

Referring to FIG. 7, when a UE 701 is in LTE cell coverage 710 supported by an LTE base station (eNB) 702, the UE 701 may establish an RRC connection with the LTE base station 702, as described in FIG. 5, and may transmit and receive data for a first bearer 705. When the UE 701 is in NR cell coverage 720 supported by an NR base station having the gNB CU 703 and gNB DU1 704, the UE 701 may establish an RRC connection with the NR base station, as described in FIG. 5, and may transmit and receive data for a second bearer 715.

Downlink data for the second bearer 715 is processed via an NR PDCP-layer device, an NR RLC-layer device, an NR MAC-layer device, and an NR PHY-layer device of the gNB CU 703 and gNB DU1 704, is transmitted via a radio link, and is received and processed via an NR PHY-layer device, an NR MAC-layer device, an NR RLC-layer device, and an NR PDCP-layer device of the UE 701. Uplink data for the second bearer 715 is processed via the NR PDCP-layer device, the NR RLC-layer device, the NR MAC-layer device, and the NR PHY-layer device of the UE 701, is transmitted via the radio link, and is received and processed via the NR PHY-layer device, the NR MAC-layer device, the NR RLC-layer device, and the NR PDCP-layer device of the gNB CU 703 and gNB DU1 704.

However, as illustrated in FIG. 7, when the UE 701 establishes the RRC connections to the LTE base station 702 and the gNB CU 703 and gNB DU1 704 at the same time and transmits and receives data, if the first bearer 705 is managed by the LTE base station 702, and the second bearer 715 is managed by the gNB CU 703 and gNB DU1 704, the management of a network may be complicated. In order to manage data traffic for one UE 701 by two different base stations (the LTE base station 702 and the gNB CU 703 and gNB DU1 704) together, it is necessary to exchange control signals between the base stations, thus causing a transmission delay and difficulty in the management.

Accordingly, disclosed herein is a method and a device in which a network enables an NR base station, which is capable of operating a larger number of transmission resources and has improved performance, to manage all traffic for a UE when the UE simultaneously accesses the next-generation mobile communication base station (NR base station) and an LTE base station. To this end, a method and a device are provided that enable the NR base station to manage all the traffic of the UE by changing an LTE PDCP-layer device, which processes data served through the LTE base station, to an NR PDCP-layer device of the next-generation mobile communication system.

Figure 8:
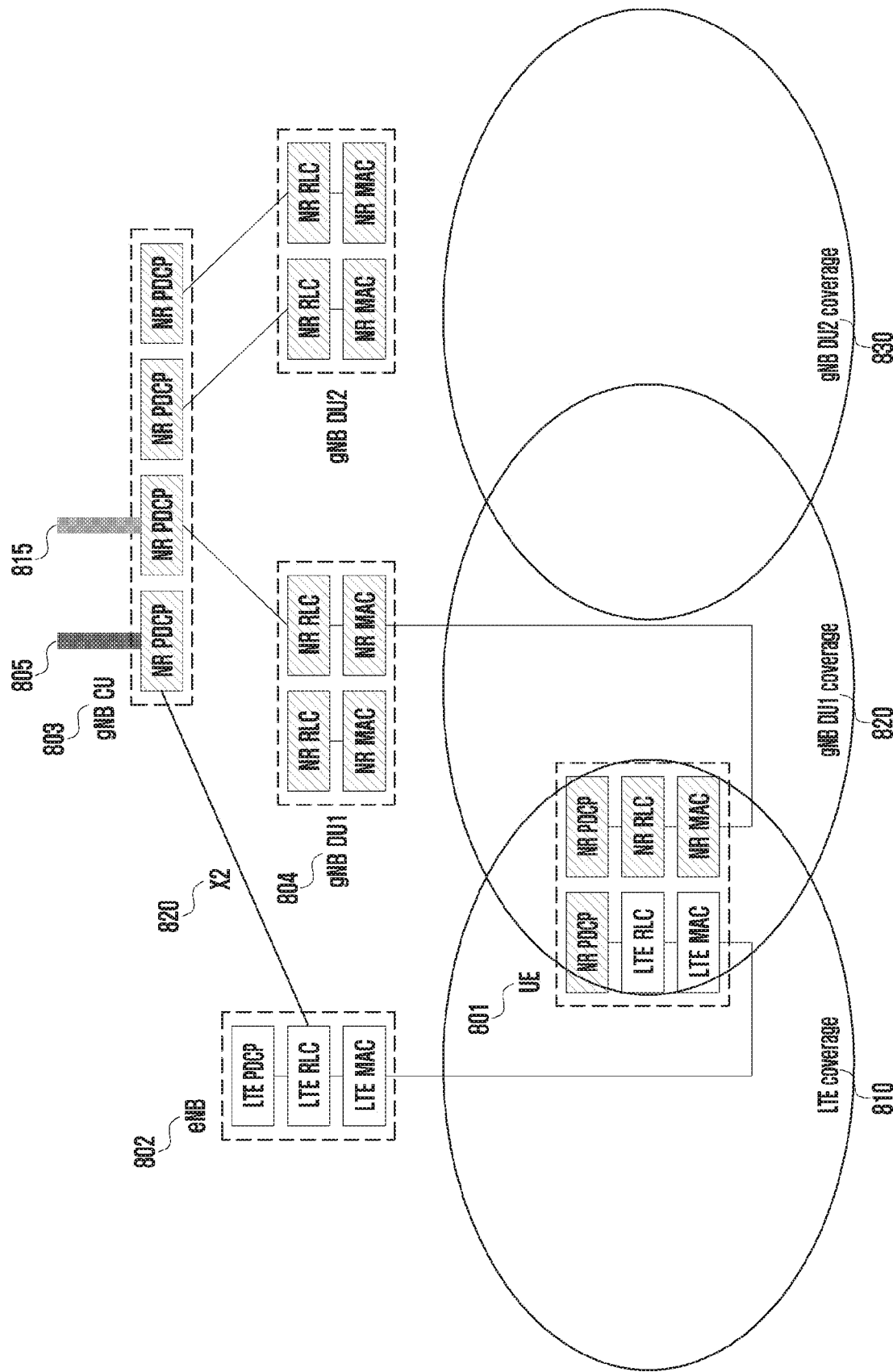
FIG. 8 illustrates a protocol structure in which a UE changes the version of a PDCP-layer device and transmits and receives data when establishing a connection with an LTE base station and establishing a connection with an NR base station according to an embodiment.

FIG. 8 illustrates a protocol structure in which a UE changes the version of a PDCP-layer device and transmits and receives data when establishing a connection with an LTE base station and establishing a connection with an NR base station according to an embodiment. The gNB DU coverage 820 is managed by the gNB DU1 804 and the gNB DU2 coverage 830 is managed by the gNB DU2.

Referring to FIG. 8, when a UE 801 is in LTE cell coverage 810 supported by an LTE base station 802, the UE 801 may establish an RRC connection with the LTE base station 802 and may transmit and receive data for a first bearer 805 as described in FIG. 5. When the UE 801 is in NR cell coverage 820 supported by an NR base station having gNB CU 803 and gNB DU1 804, the UE 801 may establish an RRC connection with the NR base station, as described in FIG. 5. When establishing the RRC connection, the UE 801 may establish a connection between an NR PDCP-layer device and an LTE RLC-layer device for the first bearer by releasing an LTE PDCP-layer device for the first bearer and by newly configuring the NR PDCP-layer device, and may transmit and receive data. The UE 801 may configure a second bearer 815 and may transmit and receive data.

Downlink data for the first bearer 805 is processed via an NR PDCP-layer device of the gNB CU 803 and gNB DU1 804, an interface between the base stations, such as a gNB DU1 coverage or X2 interface 820, an LTE RLC-layer device, an LTE MAC-layer device, and an LTE PHY-layer device of the LTE base station 802, is transmitted via a radio link, and is received and processed via an LTE PHY-layer device, an LTE MAC-layer device, an LTE RLC-layer device, and an NR PDCP-layer device of the UE 801. Uplink data for the first bearer 805 is processed via the NR PDCP-layer device, the LTE RLC-layer device, the LTE MAC-layer device, and the LTE PHY-layer device of the UE 801, is transmitted via the radio link, and is received and processed via the LTE PHY-layer device, the LTE MAC-layer device, the LTE RLC-layer device of the LTE base station 802, the interface between the base stations, such as the gNB DU1 coverage or X2 interface 820, and the NR PDCP-layer device of the NR base station 803 and 804.

Downlink data for the second bearer 815 is processed via the NR PDCP-layer device, an NR RLC-layer device, an NR MAC-layer device, and an NR PHY-layer device of the gNB CU 803 and gNB DU1 804, is transmitted via a radio link, and is received and processed via an NR PHY-layer device, an NR MAC-layer device, an NR RLC-layer device, and the NR PDCP-layer device of the UE 801. Uplink data for the second bearer 815 is processed via the NR PDCP-layer device, the NR RLC-layer device, the NR MAC-layer device, and the NR PHY-layer device of the UE 801, is transmitted via the radio link, and is received and processed via the NR PHY-layer device, the NR MAC-layer device, the NR RLC-layer device, and the NR PDCP-layer device of the gNB CU 803 and gNB DU1 804.

As described above, the NR base station 803 and 804 can manage any bearer or any data traffic for the UE 801 as indicated by reference numerals 805 and 815, thus preventing unnecessary signaling between the LTE base station 802 and the NR base station 803 and 804, and enabling one of the gNB CU 803 or gNB DU1 804 to effectively manage the traffic of the UE 801.

Figure 9:
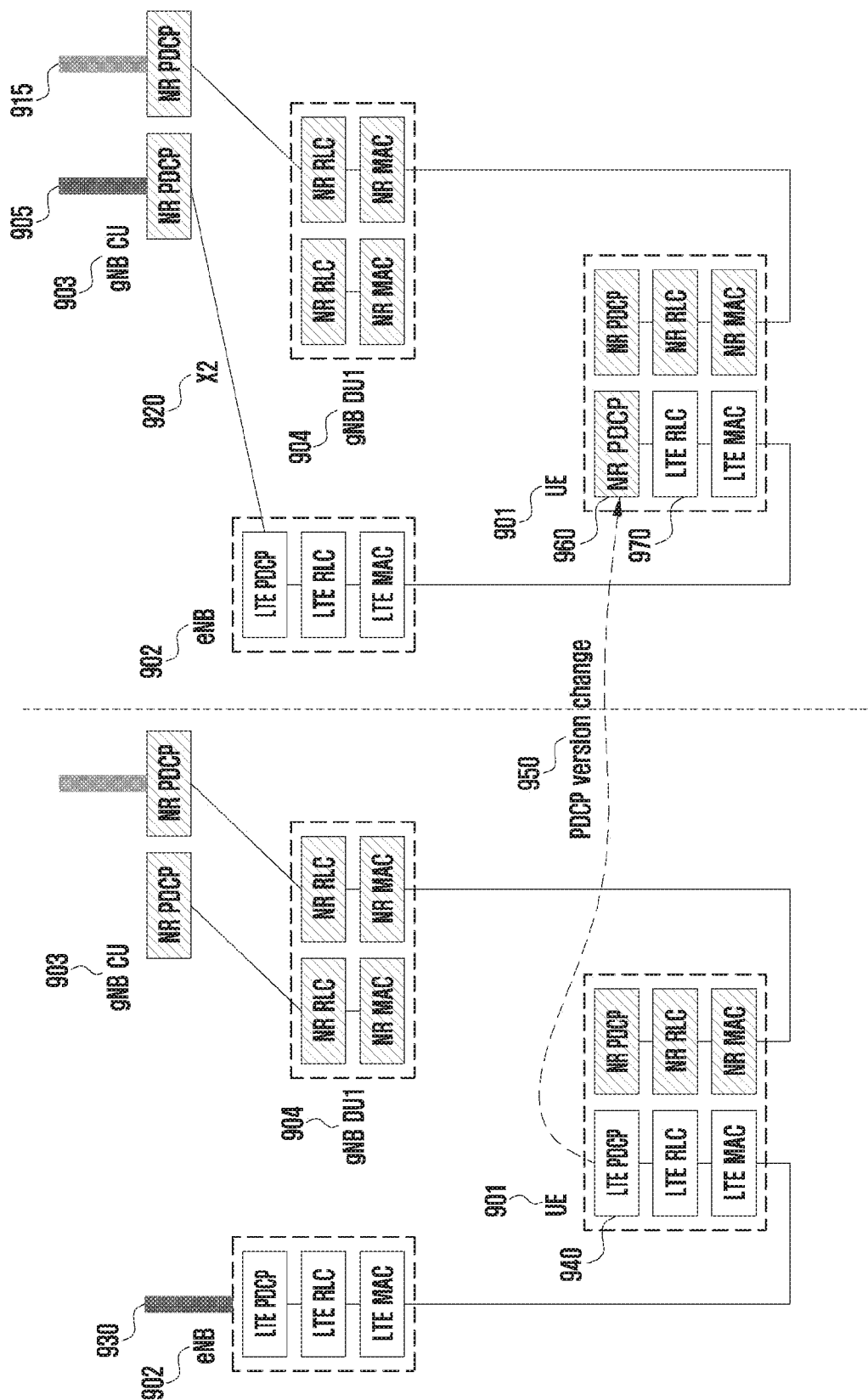
FIG. 9 illustrates a procedure in which a UE changes the version of a PDCP-layer device when establishing a connection with an LTE base station and establishing a connection with an NR base station according to an embodiment.

FIG. 9 illustrates a procedure in which a UE changes the version of a PDCP-layer device when establishing a connection with an LTE base station and establishing a connection with an NR base station according to an embodiment.

Referring to FIG. 9, when a UE 901 is in LTE cell coverage supported by an LTE base station 902, the UE 901 may establish an RRC connection with the LTE base station 902 and may transmit and receive data for a first bearer 805 as described in FIG. 5. When the UE 901 is in NR cell coverage supported by an NR base station having gNB CU 903 and gNB DU1 904, the UE 901 may establish an RRC connection with the gNB CU 903 and gNB DU1 904, as described in FIG. 5. When establishing the RRC connection or receiving an RRC message from the LTE base station, the UE 901 may establish a connection between an NR PDCP-layer device 960 and an LTE RLC-layer device 970 for the first bearer 930 by releasing an LTE PDCP-layer device 940 for the first bearer 930 and by newly configuring the NR PDCP-layer device 960, thereby changing a PDCP-layer device version 950, and may transmit and receive data through the changed NR PDCP-layer device 960.

Accordingly, the NR base station 903 and 904 can manage the first bearer 930, which has been managed by the LTE base station 902, as a first bearer 905 in the gNB CU 903 and gNB DU1 904, along with a second bearer 915. The gNB CU 903 and gNB DU1 904 may transmit and receive data for the first bearer 905 through an interface 920 between the base stations.

When the UE having accessed the LTE base station and the NR base station is disconnected from the NR base station due to departure from the NR cell coverage or an indication from a network, the NR PDCP-layer device, which has established the connection with the LTE RLC-layer device due to the PDCP version change, may be changed back to the LTE PDCP-layer device. That is, the PDCP version change 950 may be performed in reverse according to an indication of an RRC message.

Figure 10:
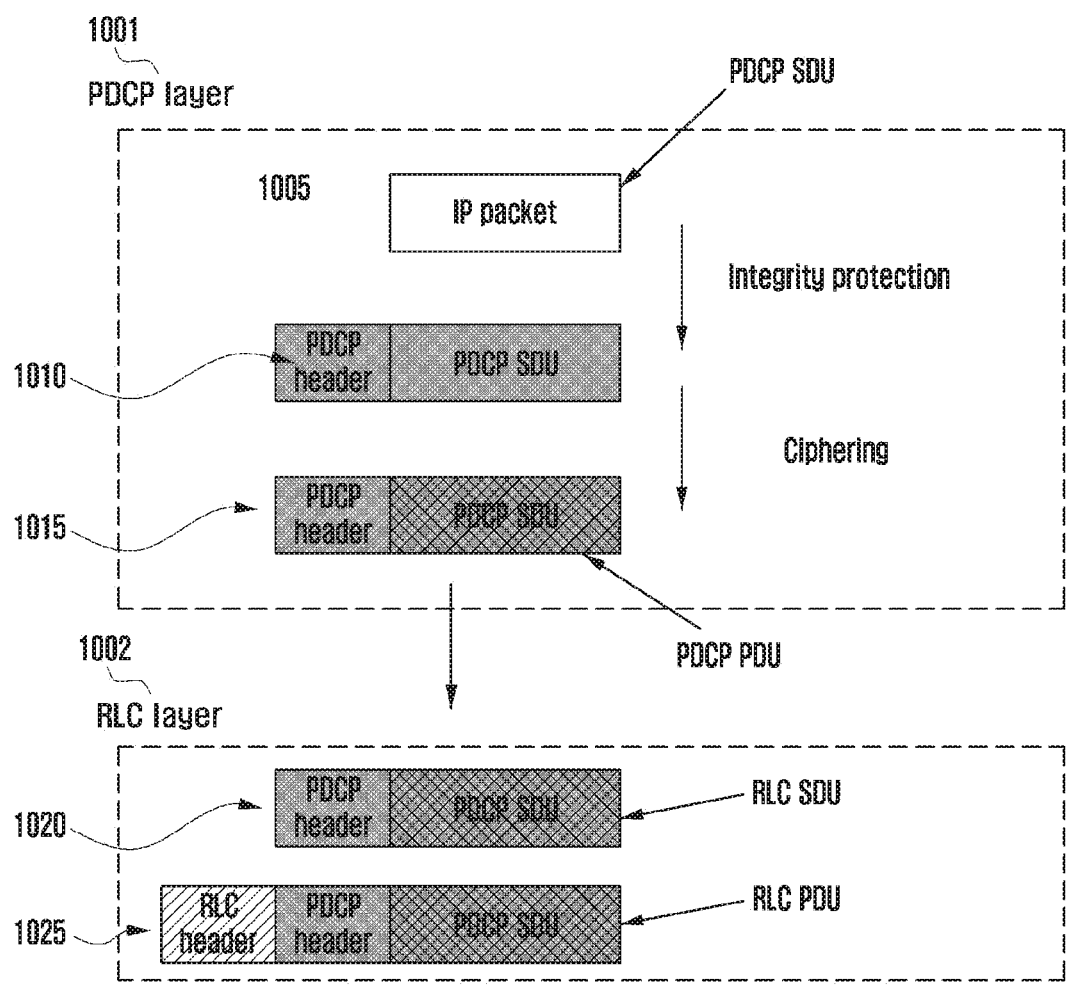
FIG. 10 illustrates a procedure of processing data in a PDCP-layer device and a radio link control (RLC)-layer device of a UE according to an embodiment.

FIG. 10 illustrates a procedure of processing data in a PDCP-layer device and an RLC-layer device of a UE according to an embodiment.

Referring to FIG. 10, when receiving data, such as an IP packet or a PDCP SDU 1005, from an upper-layer device, a PDCP-layer device 1001 of a UE may apply an integrity protection procedure to the PDCP SDU and a PDCP header 1010 using a security key configured by a base station. The PDCP-layer device 1001 may configure a PDCP PDU 1015 by applying a ciphering procedure only to PDCP SDU using the security key and may transmit the PDCP PDU 1015 to a lower-layer device 1002.

Upon receiving an RLC SDU (or PDCP PDU) 1020 from an upper-layer device 1001, the RLC-layer device 1002 of the UE may generate an RLC header corresponding to the RLC SDU, may configure an RLD PDU 1025, and may transmit the RLD PDU 1025 to a lower-layer device, such as a MAC-layer device.

Figure 11:
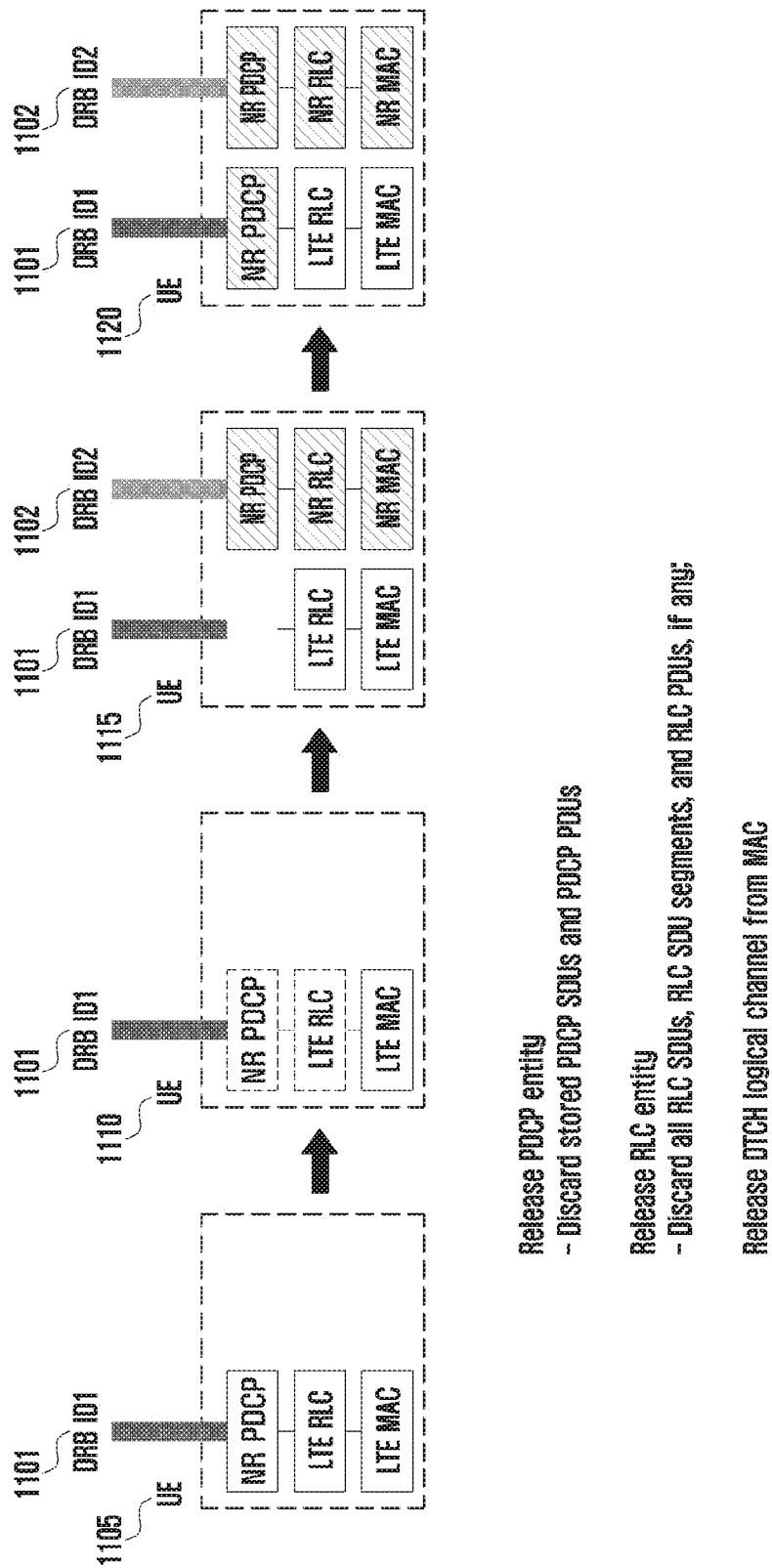
FIG. 11 illustrates a method of changing the version of a PDCP-layer device according to an embodiment.

FIG. 11 illustrates a method of changing the version of a PDCP-layer device according to an embodiment, which may be applied to a change from an LTE PDCP-layer device to an NR PDCP-layer device or from an NR PDCP-layer device to an LTE PDCP-layer device.

Referring to FIG. 11, a UE may receive an RRC message from an LTE base station or an NR base station. When the RRC message indicates a change of the version of a PDCP-layer device for a certain bearer, such as when the RRC message includes a configuration for releasing an LTE PDCP-layer device corresponding to a first bearer identifier (DRB ID1)1101, the RRC message includes does not include NR PDCP configuration information corresponding to the first bearer identifier 1101, and an NR PDCP-layer device for the first bearer identifier 1101 is already configured (when an LTE PDCP-layer device for a bearer is changed to an NR PDCP-layer device) or when the RRC message includes a configuration for releasing the NR PDCP-layer device for the first bearer identifier 1101, which is established for the NR PDCP-layer device and the LTE RLC-layer device, and includes LTE PDCP configuration information corresponding to the first bearer identifier 1101 (when an NR PDCP-layer device for a bearer is changed to an LTE PDCP-layer device), the following procedure may be performed. DRB ID 2 1102 corresponds to an NR RLC layer associated with an NR PDCP layer.

1. When the UE receives an indication to change the version of a PDCP-layer device for a first bearer of an RRC message in step 1105:

A. The UE identifies the identifier of the bearer and discards all pieces of data (for example, a PDCP SDU and/or a PDCP PDU) stored in a current PDCP-layer device (among an LTE PDCP layer device or an NR PDCP layer device) corresponding to the identifier of the bearer in step 1110).

B. After discarding all data stored in the current PDCP-layer device, the UE releases the configuration of the current PDCP-layer device, such as by releasing a stored state parameter value, timer value, COUNT value, or ROHC configuration, and releases the PDCP-layer device from the identifier of the bearer in step 1110.

C. The UE identifies the identifier of the bearer and discards all data pieces of (for example, an RLC SDU and/or an RLC PDU) stored in a current RLC-layer device corresponding to the identifier of the bearer in step 1110.

D. The UE establishes a new PDCP-layer device with respect to the identifier of the bearer by applying a configuration of the new PDCP-layer device included in the RRC message and indicated for a new configuration in step 1110.

E. After discarding all pieces of data stored in the current RLC-layer device, the UE releases the configuration of the current RLC-layer device, such as the stored state parameter value or timer value, and releases the RLC-layer device from the identifier of the bearer. The UE newly establishes the RLC-layer device for the identifier of the bearer according to the configuration of the RLC-layer device included in the RRC message in step 1115.

F. In addition, the UE may release the identifier of a current data traffic channel (dedicated traffic channel (DTCH)) corresponding to the identifier of the bearer in a MAC-layer device corresponding to the identifier of the bearer and may newly configure the identifier of a new data traffic channel included in the RRC message for the MAC-layer device in step 1115.

G. The UE may establish a connection between the newly established PDCP-layer device for the identifier of the bearer and the RLC-layer device or the MAC-layer device, thereby completing the procedure of changing the version of a PDCP-layer device in step 1120. The newly configured PDCP-layer device starts transmission.

A network supporting a next-generation mobile communication system can also support an LTE system and can provide services for UEs via an NR base station and an LTE base station which are installed. In the network, a UE may receive services by accessing the next-generation mobile communication base station or the LTE base station. However, when the UE simultaneously accesses the next-generation mobile communication base station and the LTE base station, the network requires a procedure for changing an LTE PDCP-layer device, which processes data served through the LTE base station, to an NR PDCP-layer device of the next-generation mobile communication system in order to enable the NR base station, which is capable of operating a larger number of transmission resources and has improved performance, to manage all traffic for the UE. When an LTE PDCP-layer device of the UE is changed to an NR PDCP-layer device due to a change between the PDCP-layer devices of the two different systems or when the LTE PDCP-layer device is changed to the NR PDCP-layer device, data loss may occur.

In contrast, when the UE (non-standalone (NSA)) simultaneously connected to the NR base station and the LTE base station is disconnected from the NR base station and is thus served only by the LTE base station, a procedure for changing the changed NR PDCP-layer device back to the LTE PDCP-layer device is required, in which case data loss may also occur. That is, as shown in FIG. 11, in step 1110 of changing the PDCP-layer device, all stored data is discarded and the new PDCP-layer device is configured while releasing the currently configured PDCP-layer device, and thus data loss may occur with respect to the first bearer 1101.

Therefore, the following discloses a procedure for changing a PDCP-layer device without data loss when a UE receives an RRC message from an LTE base station or an NR base station and a change from an LTE PDCP-layer device to an NR PDCP-layer device or a change from the NR PDCP-layer device to the LTE PDCP-layer device is indicated for a bearer having the same bearer identifier. Specifically, before the version of a PDCP-layer device is changed, the UE transmits pieces of data (for example, PDCP SDUs) stored in the PDCP-layer device (for example, the LTE PDCP layer device) before the change to a newly changed PDCP-layer device (for example, the NR PDCP layer device) or newly stores the data in the newly changed PDCP-layer device so that the newly changed PDCP-layer device (for example, the NR PDCP layer device) considers the data as being newly received and processes the data.

The UE may determine data to transmit to or store in the newly changed PDCP-layer device among the pieces of data (for example, PDCP SDUs) stored in the PDCP-layer device before the PDCP version change according to one of the following methods.

1. First Embodiment

The UE may deliver and store all PDCP SDUs stored in the PDCP-layer device before the change to and in the newly changed PDCP-layer device to process the data as new data and may deliver the data to a lower-layer device for transmission.

2. Second Embodiment (Cumulative Retransmission)

The UE may deliver and store all pieces of data having a value equal to or greater than the PDCP sequence number or the COUNT value of first data, of which successful delivery is not acknowledged (RLC NACK) from RLC-layer devices (via RLC status PDUs) connected to the PDCP-layer device before the change, among the data (for example, PDCP SDUs) stored in the PDCP-layer device before the change in ascending order, or all pieces of data received from an upper-layer device after the first data in sequence to and in the newly changed PDCP-layer device to process the data as new data and may deliver the data to a lower-layer device for transmission.

3. Third Embodiment (Selective Retransmission)

The UE may deliver and store only pieces of data, of which successful delivery is not acknowledged (RLC NACK) from RLC-layer devices connected to the PDCP-layer device before the change, among the data stored in the PDCP-layer device before the change, in ascending order of PDCP sequence numbers or COUNT values or in order as received from an upper-layer device, to and in the newly changed PDCP-layer device to process the data as new data and may deliver the data to a lower-layer device for transmission.

In another method, the successful delivery of data of a PDCP-layer device may be identified using not only an RLC status report of an RLC-layer device but also a PDCP status report of the PDCP-layer device.

Figure 12:
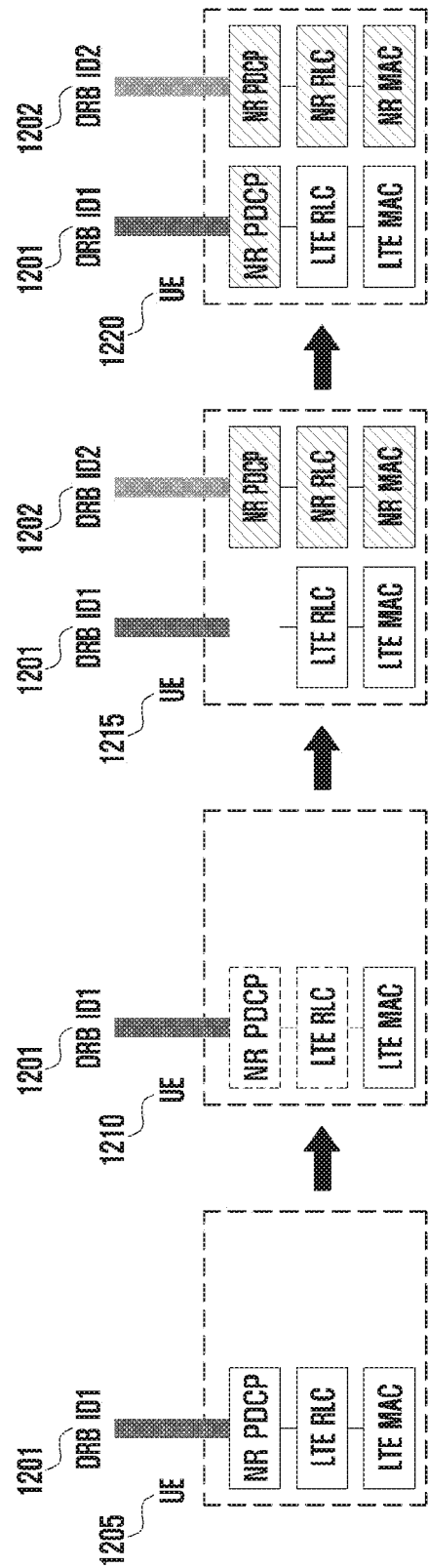
FIG. 12 illustrates a method of changing the version of a PDCP-layer device without loss according to an embodiment.

FIG. 12 illustrates a method of changing the version of a PDCP-layer device without loss according to an embodiment, which may be applied to a change from an LTE PDCP-layer device to an NR PDCP-layer device or a change from an NR PDCP-layer device to an LTE PDCP-layer device.

In FIG. 12, a UE may receive an RRC message from an LTE base station or an NR base station. When the RRC message indicates a change of the version of a PDCP-layer device for a certain bearer, for example, when the RRC message includes a configuration for releasing an LTE PDCP-layer device corresponding to a first bearer identifier 1201, the RRC message includes does not include NR PDCP configuration information corresponding to the first bearer identifier 1201, and an NR PDCP-layer device for the first bearer identifier 1201 is already configured (when an LTE PDCP-layer device for a bearer is changed to an NR PDCP-layer device) or when the RRC message includes a configuration for releasing the NR PDCP-layer device for the first bearer identifier 1201, which is established for the NR PDCP-layer device and the LTE RLC-layer device, and includes LTE PDCP configuration information corresponding to the first bearer identifier 1201 (when an NR PDCP-layer device for a bearer is changed to an LTE PDCP-layer device), the following procedure may be performed. The DRB ID 2 1202 corresponds to an NR RLC layer associated with an NR PDCP layer.

1. When the UE receives an indication to change the version of a PDCP-layer device for the first bearer of an RRC message in step 1205:

A. The UE identifies the identifier of the bearer, and delivers and stores all pieces of data (for example, PDCP SDUs and/or PDCP PDUs) stored in a current PDCP-layer device corresponding to the identifier of the bearer, in ascending order of PDCP sequence numbers or COUNT values or in order as received from an upper-layer device, to and in a newly changed PDCP-layer device to process the data as new data in step 1210.

B. After transmitting the pieces of data stored in the current PDCP-layer device to the newly configured or changed PDCP-layer device, the UE releases the configuration of the current PDCP-layer device, such as a stored state parameter value, timer value, COUNT value, or ROHC configuration, and releases the PDCP-layer device from the identifier of the bearer in step 1210.

C. The UE identifies the identifier of the bearer and discards all data pieces of (for example, an RLC SDU and/or an RLC PDU) stored in a current RLC-layer device corresponding to the identifier of the bearer in step 1210.

D. The UE establishes a new PDCP-layer device with respect to the identifier of the bearer by applying a configuration of the new PDCP-layer device included in the RRC message and indicated for a new configuration, processes (encrypts using a new encryption key or performs integrity protection) the data (for example, a PDCP SDU) delivered from the PDCP-layer device, which has been previously configured but currently released, and prepares for transmission in step 1210.

E. After discarding all pieces of data stored in the current RLC-layer device, the UE releases the configuration of the current RLC-layer device and releases the RLC-layer device from the identifier of the bearer. The UE newly establishes the RLC-layer device for the identifier of the bearer according to the configuration of the RLC-layer device included in the RRC message in step 1215.

F. In addition, the UE may release the identifier of a current data traffic channel (DTCH) corresponding to the identifier of the bearer in a MAC-layer device corresponding to the identifier of the bearer and may newly configure the identifier of a new data traffic channel included in the RRC message for the MAC-layer device in step 1215.

G. The UE may establish a connection between the newly established PDCP-layer device for the identifier of the bearer and the RLC-layer device or the MAC-layer device, thereby completing the procedure of changing the version of a PDCP-layer device in step 1220. The newly configured PDCP-layer device starts transmission.

When the UE receives RRC messages from the LTE base station or the NR base station and receives an indication to change the version of a PDCP-layer device for a certain bearer, the UE performs a second embodiment as follows.

1. When the UE receives an indication to change the version of a PDCP-layer device for the first bearer of an RRC message in step 1205:

A. The UE identifies the identifier of the bearer, and delivers and stores all pieces of data having a value equal to or greater than the PDCP sequence number or the COUNT value of first data, of which successful delivery is not acknowledged (RLC NACK) from RLC-layer devices (via RLC status PDUs) connected to the current PDCP-layer device (before the change), among pieces of data (for example, a PDCP SDU and/or a PDCP PDU) stored in a current PDCP-layer device corresponding to the identifier of the bearer in ascending order, or all pieces of data received from an upper-layer device after the first data in sequence to and in the newly changed PDCP-layer device to process the data as new data in step 1210.

B. After transmitting the pieces of data stored in the current PDCP-layer device to the newly configured or changed PDCP-layer device, the UE releases the configuration of the current PDCP-layer device and releases the PDCP-layer device from the identifier of the bearer in step 1210.

C. The UE identifies the identifier of the bearer and discards all data pieces of (for example, an RLC SDU and/or an RLC PDU) stored in a current RLC-layer device corresponding to the identifier of the bearer in step 1210.

D. The UE establishes a new PDCP-layer device with respect to the identifier of the bearer by applying a configuration of the new PDCP-layer device included in the RRC message and indicated for a new configuration, processes (encrypts using a new encryption key and/or performs integrity protection) the data delivered from the PDCP-layer device, which has been previously configured but currently released, and prepares for transmission in step 1210.

E. After discarding all pieces of data stored in the current RLC-layer device, the UE releases the configuration of the current RLC-layer device and releases the RLC-layer device (for example, releases a stored state parameter value or timer value) from the identifier of the bearer. The UE newly establishes the RLC-layer device for the identifier of the bearer according to the configuration of the RLC-layer device included in the RRC message in step 1215.

F. In addition, the UE may release the identifier of a current DTCH corresponding to the identifier of the bearer in a MAC-layer device corresponding to the identifier of the bearer and may newly configure the identifier of a new data traffic channel included in the RRC message for the MAC-layer device in step 1215.

G. The UE may establish a connection between the newly established PDCP-layer device for the identifier of the bearer and the RLC-layer device or the MAC-layer device, thereby completing the procedure of changing the version of a PDCP-layer device in step 1220. The newly configured PDCP-layer device starts transmission.

As described above, when the UE receives RRC messages from the LTE base station or the NR base station and receives an indication to change the version of a PDCP-layer device for a certain bearer, the UE performs a third embodiment according to the disclosure.

1. When the UE receives an indication to change the version of a PDCP-layer device for the first bearer of an RRC message in step 1205:

A. The UE identifies the identifier of the bearer, and delivers and stores only pieces of data, of which successful delivery is not acknowledged (RLC NACK) from RLC-layer devices connected to the PDCP-layer device before the change, among pieces of data (for example, a PDCP SDU and/or a PDCP PDU) stored in a current PDCP-layer device corresponding to the identifier of the bearer, in ascending order of PDCP sequence numbers or COUNT values or in order as received from an upper-layer device, to and in the newly changed PDCP-layer device to process the data as new data in step 1210.

B. After transmitting the pieces of data stored in the current PDCP-layer device to the newly configured or changed PDCP-layer device, the UE releases the configuration of the current PDCP-layer device, such as a stored state parameter value, timer value, COUNT value, or ROHC configuration, and releases the PDCP-layer device from the identifier of the bearer in step 1210.

C. The UE identifies the identifier of the bearer and discards all data pieces of (for example, an RLC SDU and/or an RLC PDU) stored in a current RLC-layer device corresponding to the identifier of the bearer in step 1210.

D. The UE establishes a new PDCP-layer device with respect to the identifier of the bearer by applying a configuration of the new PDCP-layer device included in the RRC message and indicated for a new configuration, processes (encrypts using a new encryption key or performs integrity protection) the PDCP SDU delivered from the PDCP-layer device, which has been previously configured but currently released, and prepares for transmission in step 1210.

E. After discarding all pieces of data stored in the current RLC-layer device, the UE releases the configuration of the current RLC-layer device, such as a stored state parameter value or timer value, and releases the RLC-layer device from the identifier of the bearer. The UE newly establishes the RLC-layer device for the identifier of the bearer according to the configuration of the RLC-layer device included in the RRC message in step 1215.

F. In addition, the UE may release the identifier of a current DTCH corresponding to the identifier of the bearer in a MAC-layer device corresponding to the identifier of the bearer and may newly configure the identifier of a new data traffic channel included in the RRC message for the MAC-layer device in step 1215.

G. The UE may establish a connection between the newly established PDCP-layer device for the identifier of the bearer and the RLC-layer device or the MAC-layer device, thereby completing the procedure of changing the version of a PDCP-layer device in step 1220. The newly configured PDCP-layer device starts transmission.

As described above, when a UE receives an RRC message and receives an indication to change the version of a PDCP-layer device, in order to prevent the loss of uplink data of a first bearer, the UE releases an existing version of a PDCP-layer device corresponding to the first bearer and delivers pieces of data (for example, PDCP SDUs) stored in the existing version of the PDCP-layer device to a newly configured version of a PDCP-layer device before discarding the data so that the new version of the PDCP-layer device processes the data again, such as by configuring a PDCP PDU by newly configuring a PDCP header for the delivered PDCP SDUs according to the configuration of the new PDCP-layer device and by performing integrity protection or encryption with a new security key, regarding the data as being received from an upper-layer device, and transmits the data.

The same method of changing the version of the PDCP-layer device without loss disclosed herein may also be applied to base stations for downlink data in an extended manner. For example, when a base station transmits an indication to change the version of a PDCP-layer device to a UE via an RRC message, in order to prevent the loss of downlink data of a first bearer, the base station having an existing version of a PDCP-layer device corresponding to the first bearer may release the PDCP-layer device and may deliver pieces of data (for example, PDCP SDUs) stored in the existing version of the PDCP-layer device to a base station having a newly configured version of a PDCP-layer device before discarding the data so that the new version of the PDCP-layer device may process the data again, such as by configuring a PDCP PDU by newly configuring a PDCP header for the delivered PDCP SDUs according to the configuration of the new PDCP-layer device and by performing integrity protection or encryption with a new security key, regarding the data as being received from an upper-layer device, and may transmit the data. The first embodiment, the second embodiment, or the third embodiment of the method of changing the version of the PDCP-layer device without loss disclosed herein may also be applied to an LTE base station and an NR base station which transmit downlink data in an extended manner.

Figure 13:
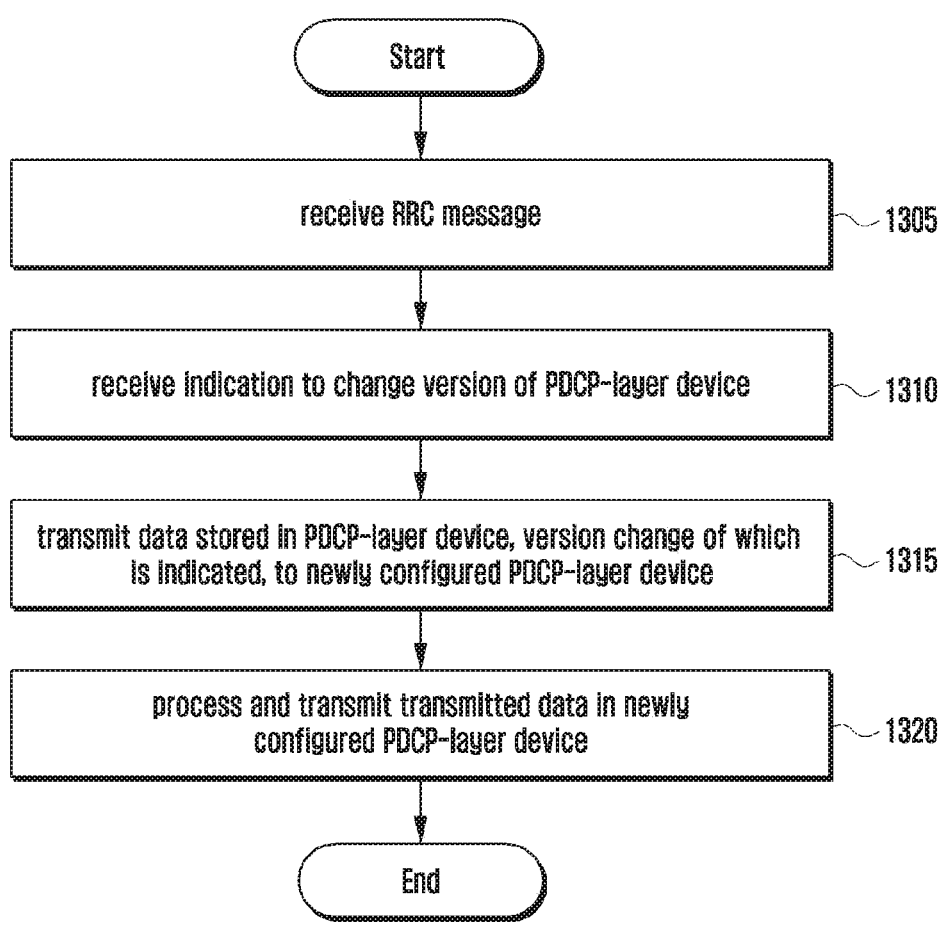
FIG. 13 illustrates a UE operation in a procedure for changing the version of a PDCP-layer device without loss according to an embodiment.

FIG. 13 illustrates a UE operation in a procedure for changing the version of a PDCP-layer device without loss according to an embodiment.

In FIG. 13, a UE receives an RRC message in step 1305. The RRC message may be either an RRC connection setup message (RRCConnectionSetup message) or an RRC connection reconfiguration message (RRCConnectionReconfiguration message), without being limited thereto.

The UE identifies whether an indication to change the version of a PDCP-layer device is received based on the RRC message in step 1310. When the indication to change the version of the PDCP-layer device is received, in order to prevent the loss of uplink data of a first bearer, the UE releases an existing version of a PDCP-layer device corresponding to the first bearer and delivers pieces of data (for example, PDCP SDUs) stored in the existing version of the PDCP-layer device to a newly configured version of a PDCP-layer device before discarding the data in step 1315. The new version of the PDCP-layer device regards the data delivered from the existing PDCP-layer device as being data received from an upper-layer device and processes the data again, such as by configuring a PDCP PDU by newly configuring a PDCP header for the delivered PDCP SDUs according to the configuration of the new PDCP-layer device and by performing integrity protection or encryption with a new security key, and transmits the data in step 1320.

In the UE operation, pieces of data to transmit to a PDCP-layer device after a version change among pieces of data (for example, PDCP SDUs) stored in a PDCP-layer device before the version change may be determined according to the first embodiment, the second embodiment, or the third embodiment provided in the disclosure.

Although FIG. 13 illustrates uplink transmission of a UE as an example, the foregoing operation may be equally applied to the downlink operation of a base station. The UE or the base station may be defined as a transmission device. When the transmission device identifies a PDCP-layer device version change through an RRC message or the like, the transmission device may change a PDCP-layer device and prevent data loss according to the methods herein, thus transmitting data via a new version of a PDCP-layer device.

Figure 14:
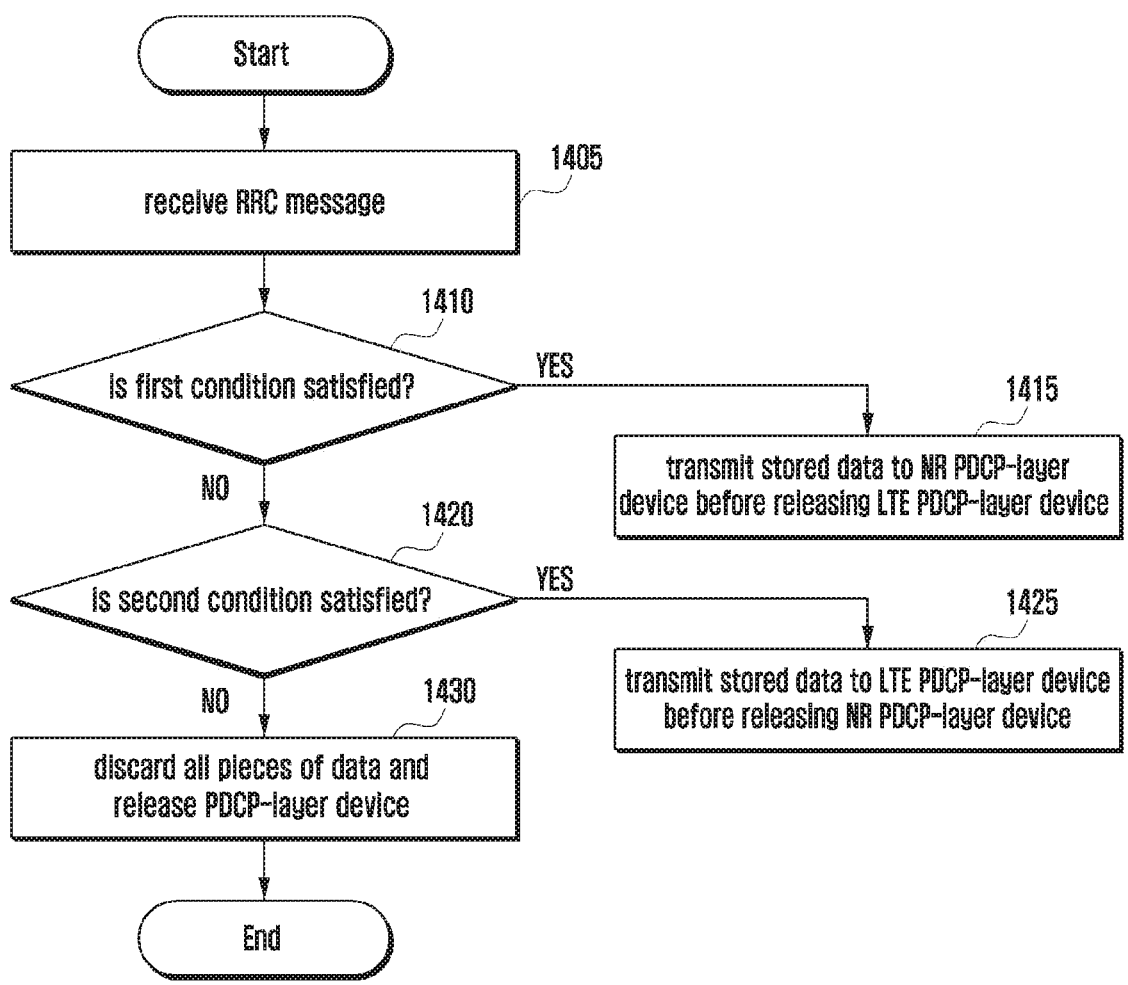
FIG. 14 illustrates a detailed UE operation in a procedure for changing the version of a PDCP-layer device without loss according to an embodiment.

FIG. 14 illustrates a detailed UE operation in a procedure for changing the version of a PDCP-layer device without loss according to an embodiment.

In FIG. 14, a UE receives an RRC message in step 1405. The RRC message may be either an RRC connection setup message (RRCConnectionSetup message) or an RRC connection reconfiguration message (RRCConnectionReconfiguration message), without being limited thereto.

The UE identifies whether a first condition is satisfied in step 1410.

When the first condition is satisfied, such as when the RRC message including a configuration for releasing an LTE PDCP device corresponding to a first bearer identifier does not include NR PDCP configuration information corresponding to the first bearer identifier and an NR PDCP for the first bearer identifier is already configured, i.e., when it is indicated to change the LTE PDCP-layer device to the NR PDCP-layer device, the UE performs step 1415 as follows.

The UE discards PDCP PDUs and releases the LTE PDCP-layer device. The UE completely delivers the PDCP PDUs to the NR PDCP-layer device, discards the PDCP PDUs, and then releases the LTE PDCP-layer device.

The UE processes the data, regarding the PDCP SDUs delivered from the LTE PDCP-layer device as data received from an upper layer, in the NR PDCP-layer device and transmits the data.

When a second condition is satisfied rather than the first condition in step 1420, i.e., when the RRC message including a configuration for releasing the NR PDCP device for the first bearer identifier, for which the NR PDCP device and the LTE RLC device are configured, includes configuration information about the LTE PDCP-layer device corresponding to the first bearer identifier, the UE performs step 1425 as follows.

The UE discards PDCP PDUs and releases the NR PDCP-layer device. The UE completely delivers the PDCP PDUs to the LTE PDCP-layer device, discards the PDCP PDUs, and then releases the NR PDCP-layer device.

The UE processes the data, regarding the PDCP SDUs delivered from the NR PDCP-layer device as data received from an upper layer, the LTE PDCP-layer device and transmits the data.

When neither the first condition nor the second condition is satisfied and it is indicated to release the LTE PDCP-layer device or the NR PDCP-layer device in step 1420, the UE performs step 1430 in which the UE discards PDCP SDUs and PDCP PDUs and releases the LTE PDCP-layer device or the NR PDCP-layer device.

In the UE operation, pieces of data to transmit to a PDCP-layer device after a version change among pieces of data (for example, PDCP SDUs) stored in a PDCP-layer device before the version change may be determined according to the first embodiment, the second embodiment, or the third embodiment provided in the disclosure.

Although FIG. 14 illustrates uplink transmission of a UE as an example, the foregoing operation may be equally applied to the downlink operation of a base station.

In the following embodiments, data loss that may occur due to the configuration of a PDCP reordering timer in a reception PDCP-layer device is illustrated, and a solution thereto is disclosed.

A PDCP-layer device may operate a PDCP reordering timer, and the PDCP reordering timer operates or starts when a PDCP sequence number gap occurs relative to a PDCP sequence number in the reception PDCP-layer device. When data corresponding to the PDCP sequence number gap is not received until the PDCP reordering timer expires, pieces of data are transmitted to an upper-layer device in ascending order of PDCP sequence numbers or COUNT values and a reception window is moved after the transmitted PDCP sequence number. Therefore, when the data corresponding to the PDCP sequence number gap is received after the expiration of the PDCP reordering timer, since the data is not data within the reception window, the reception PDCP-layer device discards the data, resulting in data loss.

Therefore, in order to prevent data loss, when an AM DRB is configured for a UE via an RRC message, a PDCP-layer device of the AM DRB of the UE does not use a PDCP reordering timer. Alternatively, when the AM DRB is configured, the PDCP-layer device of the AM DRB of the UE sets a PDCP reordering timer to an infinite value. Alternatively, when a base station configures an AM DRB for the UE, the base station does not configure a PDCP reordering timer of a PDCP-layer device corresponding to the AM DRB or set a PDCP reordering timer to an infinite value.

Figure 15:
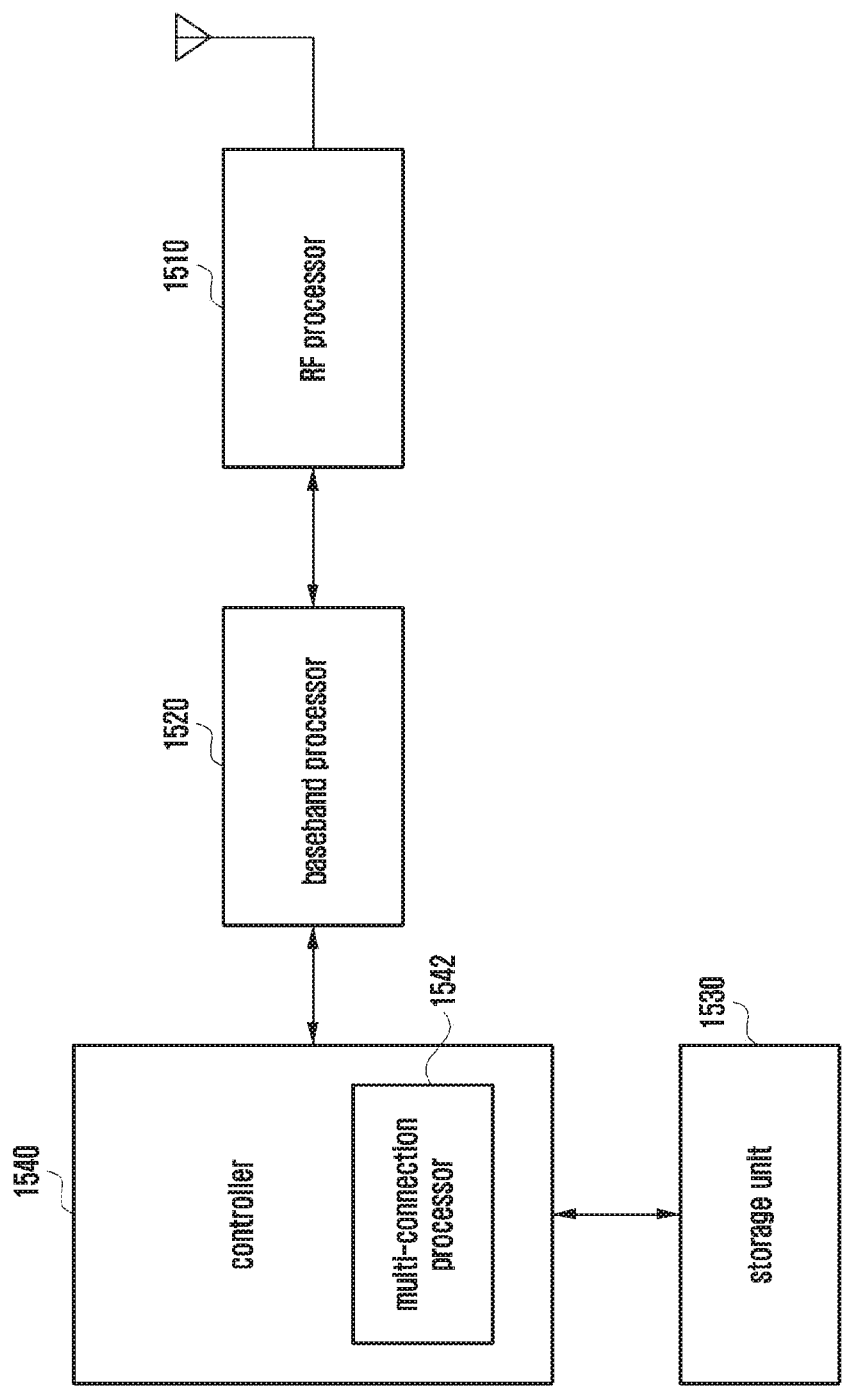
FIG. 15 illustrates the configuration of a UE according to an embodiment.

FIG. 15 illustrates the configuration of a UE according to an embodiment.

Referring to FIG. 15, the UE includes a radio frequency (RF) processor 1510, a baseband processor 1520, a storage unit 1530, and a controller 1540. The controller 1540 may include a multi-connection processor 1542.

The RF processor 1510 transmits or receives a signal through a wireless channel, such as band conversion and amplification of a signal. That is, the RF processor 1510 upconverts a baseband signal, provided from the baseband processor 1520, into an RF band signal to transmit the RF band signal through an antenna and downconverts an RF band signal, received through the antenna, into a baseband signal. The RF processor 1510 may include a transmission filter, a reception filter, an amplifier, a mixer, an oscillator, a digital-to-analog converter (DAC), and an analog-to-digital converter (ADC). Although FIG. 15 shows only one antenna, the UE may include a plurality of antennas. In addition, the RF processor 1510 may include a plurality of RF chains.

The RF processor 1510 may perform beamforming by adjusting the phase and strength of each of signals transmitted and received through a plurality of antennas or antenna elements. The RF processor may perform MIMO and may receive a plurality of layers when performing MIMO, may perform reception beam sweeping by appropriately setting the plurality of antennas or antenna elements under the control of the controller 1540, or may adjust the orientation and width of a reception beam such that the reception beam is coordinated with a transmission beam.

The baseband processor 1520 converts a baseband signal and a bit stream according to the physical-layer specification of a system. For example, in data transmission, the baseband processor 1520 encodes and modulates a transmission bit stream, thereby generating complex symbols. In data reception, the baseband processor 1520 demodulates and decodes a baseband signal, provided from the RF processor 1510, thereby reconstructing a reception bit stream. For example, according to OFDM, in data transmission, the baseband processor 1520 generates complex symbols by encoding and modulating a transmission bit stream, maps the complex symbols to subcarriers, and constructs OFDM symbols through inverse fast Fourier transform (IFFT) and cyclic prefix (CP) insertion. In data reception, the baseband processor 1520 divides a baseband signal, provided from the RF processor 1510, into OFDM symbols, reconstructs signals mapped to subcarriers through fast Fourier transform (FFT), and reconstructs a reception bit stream through demodulation and decoding.

As described above, the baseband processor 1520 and the RF processor 1510 transmit and receive signals, and thus, may be referred to as a transmitter, a receiver, a transceiver, or a communication unit. At least one of the baseband processor 1520 and the RF processor 1510 may include a plurality of communication modules to support a plurality of different radio access technologies such as LTE and NR networks, and may include different communication modules for processing signals in different frequency bands. The different frequency bands may include a super high frequency (SHF) band (for example, 2.2 GHz and 2 GHz) and a millimeter wave band (for example, 60 GHz).

The storage unit 1530 stores data, such as a default program, an application, and configuration information for operating the UE, and provides stored data upon request from the controller 1540.

The controller 1540 controls overall operations of the UE. For example, the controller 1540 transmits and receives signals through the baseband processor 1520 and the RF processor 1510, and records and reads data in the storage unit 1530. To this end, the controller 1540 may include at least one processor, such as a communication processor to perform control for communication and an application processor (AP) to control an upper layer, such as an application.

Figure 16:
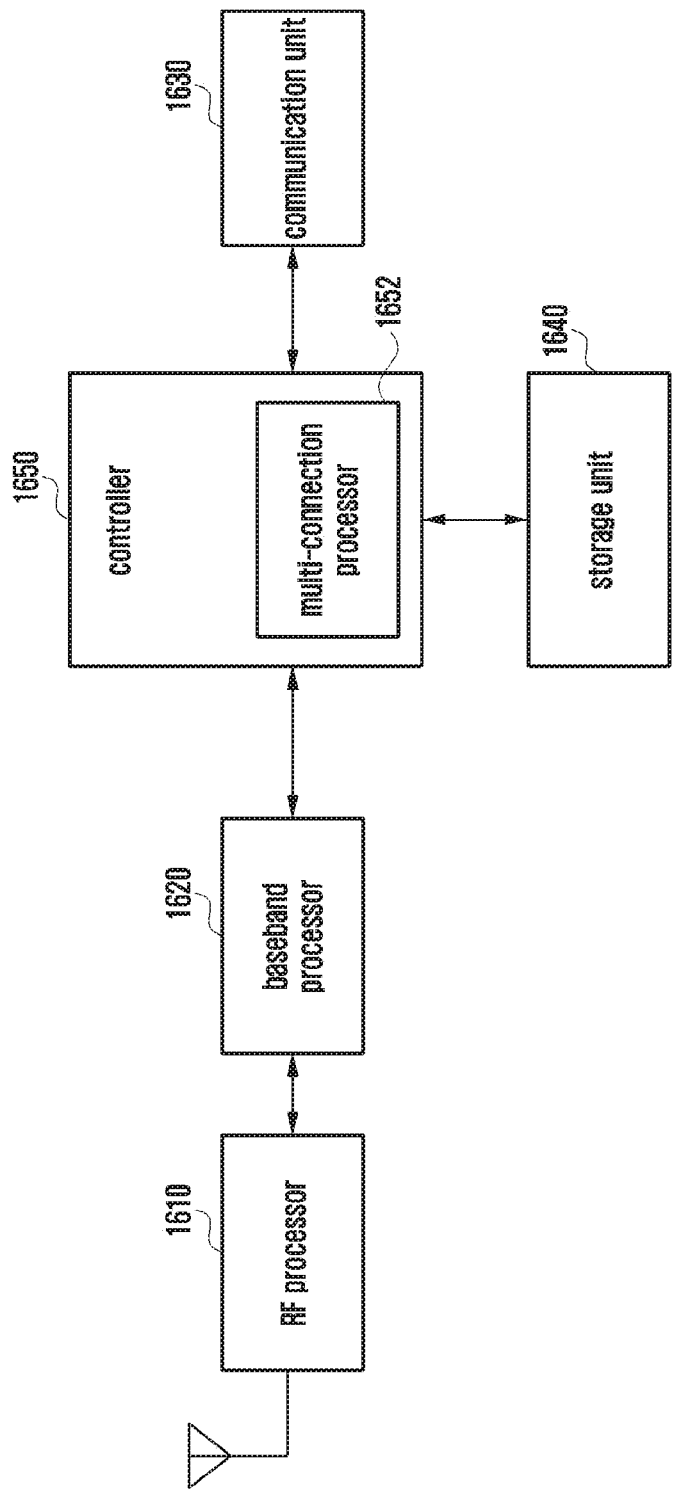
FIG. 16 illustrates the configuration of a base station according to an embodiment.

FIG. 16 illustrates the configuration of a base station according to an embodiment.

Referring to FIG. 16, the base station includes an RF processor 1610, a baseband processor 1620, a communication unit 1630, a storage unit 1640, and a controller 1650. The controller 1650 may include a multi-connection processor 1652.

The RF processor 1610 transmits or receives a signal through a wireless channel, such as band conversion and amplification of a signal. That is, the RF processor 1610 upconverts a baseband signal, provided from the baseband processor 1620, into an RF band signal to transmit the RF band signal through an antenna and downconverts an RF band signal, received through the antenna, into a baseband signal. The RF processor 1610 may include a transmission filter, a reception filter, an amplifier, a mixer, an oscillator, a DAC, and an ADC. Although FIG. 16 shows only one antenna, the base station may include a plurality of antennas. In addition, the RF processor 1610 may include a plurality of RF chains, and may perform beamforming by adjusting the phase and strength of each of signals transmitted and received through a plurality of antennas or antenna elements. The RF processor may transmit one or more layers, thereby performing downlink MIMO.

The baseband processor 1620 converts a baseband signal and a bit stream according to the physical-layer specification of a first radio access technology. For example, in data transmission, the baseband processor 1620 encodes and modulates a transmission bit stream, thereby generating complex symbols. In data reception, the baseband processor 1620 demodulates and decodes a baseband signal, provided from the RF processor 1610, thereby reconstructing a reception bit stream. For example, according to OFDM, in data transmission, the baseband processor 1620 generates complex symbols by encoding and modulating a transmission bit stream, maps the complex symbols to subcarriers, and constructs OFDM symbols through IFFT and CP insertion. In data reception, the baseband processor 1620 divides a baseband signal, provided from the RF processor 1610, into OFDM symbols, reconstructs signals mapped to subcarriers through FFT, and reconstructs a reception bit stream through demodulation and decoding. The baseband processor 1620 and the RF processor 1610 transmit and receive signals, and thus, may be referred to as a transmitter, a receiver, a transceiver, a communication unit, or a wireless communication unit.

The communication unit 1630 provides an interface for performing communication with other nodes in a network.

The storage unit 1640 stores data, such as a default program, an application, and configuration information for operating the base station. In particular, the storage unit 1640 may store information on a bearer allocated to a connected UE, a measurement result reported from a connected UE, and the like. In addition, the storage unit 1640 may store information as a criterion for determining whether to provide or stop a multi-connection to a UE. The storage unit 1640 provides stored data upon request from the controller 1650.

The controller 1650 controls overall operations of the base station. For example, the controller 1650 transmits and receives signals through the baseband processor 1620 and the RF processor 1610 or through the communication unit 1630, and records and reads data in the storage unit 1640. To this end, the controller 1650 may include at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) message including information instructing a version change from a first packet data convergence protocol (PDCP) entity for a bearer to a second PDCP entity for the bearer, the first PDCP entity and the second PDCP entity being in the terminal;
   identifying whether the first PDCP entity for the bearer is changed to the second PDCP entity for the bearer based on the information instructing the version change;
   identifying first data to be transferred from the first PDCP entity to the second PDCP entity in case that the first PDCP entity for the bearer is changed to the second PDCP entity for the bearer;
   transferring the first data from the first PDCP entity to the second PDCP entity;
   releasing the first PDCP entity;
   configuring a new PDCP header associated with the transferred first data; and
   encrypting the transferred first data with a new security key,
   wherein the first data is data having a value greater than or equal to a PDCP sequence number for which successful delivery is not acknowledged, from a radio link control (RLC) entity connected to the first PDCP entity, before reception of the RRC message,
   wherein the first PDCP entity corresponds to a long term evolution (LTE) PDCP entity, and
   wherein the second PDCP entity corresponds to a new radio (NR) PDCP entity.

2. The method of claim 1,
   wherein the first data includes at least one PDCP service data unit (SDU).

3. The method of claim 1, further comprising:
   submitting the processed data to a lower layer.

4. The method of claim 3, wherein, in case that the first PDCP entity corresponds to a new radio (NR) PDCP entity and the second PDCP entity corresponds to a long term evolution (LTE) PDCP entity,
   the lower layer entity corresponds to an NR RLC entity, and
   the second PDCP entity corresponding to the LTE PDCP entity and the NR RLC entity are associated with the bearer.

5. The method of claim 1,
wherein the lower layer entity corresponds to an LTE radio link control (RLC) entity, and
wherein the second PDCP entity corresponding to the NR PDCP entity and the LTE RLC entity are associated with the bearer.

6. The method of claim 1, further comprising:
discarding a radio link control packet data unit (RLC PDU) and an RLC service data unit (SDU), that are stored in an RLC entity associated with the first PDCP entity.

7. The method of claim 1,
wherein the RRC message includes information for releasing the first PDCP entity for the bearer without information on the second PDCP entity for the bearer, and
wherein the second PDCP entity for the bearer is configured before receiving the RRC message.

8. The method of claim 1,
wherein a PDCP reordering time value is set to infinity in case that an acknowledge mode (AM) RLC bearer is configured for the terminal.

9. The method of claim 1, wherein processing the transferred first data comprises:
performing at least one of an integrity protection, a ciphering, or a PDCP header generation for the first data.

10. A terminal in a wireless communication system, the terminal comprising:
a transceiver; and
a controller coupled with the transceiver and configured to:
receive, from a base station, a radio resource control (RRC) message including information instructing a version change from a first packet data convergence protocol (PDCP) entity for a bearer to a second PDCP entity for the bearer, the first PDCP entity and the second PDCP entity being in the terminal,
identify whether the first PDCP entity for the bearer is changed to the second PDCP entity for the bearer based on the information instructing the version change,
identify first data to be transferred from the first PDCP entity to the second PDCP entity in case that the first PDCP entity for the bearer is changed to the second PDCP entity for the bearer,
transfer the first data from the first PDCP entity to the second PDCP entity,
release the first PDCP entity,
configure a new PDCP header associated with the transferred first data, and
encrypt the transferred first data with a new security key,
wherein the first data is data having a value greater than or equal to a PDCP sequence number for which successful delivery is not acknowledged, from a radio link control (RLC) entity connected to the first PDCP entity, before reception of the RRC message,
wherein the first PDCP entity corresponds to a long term evolution (LTE) PDCP entity, and
wherein the second PDCP entity corresponds to a new radio (NR) PDCP entity.

11. The terminal of claim 10,
wherein the first data includes at least one PDCP service data unit (SDU).

12. The terminal of claim 10, wherein the controller is further configured to submit the processed data to a lower layer.

13. The terminal of claim 12, wherein, in case that the first PDCP entity corresponds to an NR PDCP entity and the second PDCP entity corresponds to an LTE PDCP entity,
the lower layer entity corresponds to an NR RLC entity, and
the second PDCP entity corresponding to the LTE PDCP entity and the NR RLC entity are associated with the bearer.

14. The terminal of claim 10,
wherein the lower layer entity corresponds to an LTE radio link control (RLC) entity, and
wherein the second PDCP entity corresponding to the NR PDCP entity and the LTE RLC entity are associated with the bearer.

15. The terminal of claim 10, wherein the controller is further configured to discard a radio link control packet data unit (RLC PDU) and an RLC service data unit (SDU), that are stored in an RLC entity associated with the first PDCP entity.

16. The terminal of claim 10,
wherein the RRC message includes information for releasing the first PDCP entity for the bearer without information on the second PDCP entity for the bearer, and
wherein the second PDCP entity for the bearer is configured before the RRC message is received.

17. The terminal of claim 10,
wherein a PDCP reordering time value is set to infinity in case that an acknowledge mode (AM) RLC bearer is configured for the terminal.

18. The terminal of claim 10, wherein the controller is configured to perform at least one of an integrity protection, a ciphering, or a PDCP header generation for the first data.

* * * * *